United States Patent
Ferrari et al.

(10) Patent No.: US 12,192,947 B2
(45) Date of Patent: Jan. 7, 2025

(54) SYSTEMS AND METHODS FOR POSITIONING WITH CHANNEL MEASUREMENTS

(71) Applicant: QUALCOMM Incorporated, San Diego, CA (US)

(72) Inventors: Lorenzo Ferrari, Oakland, CA (US); Taesang Yoo, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 16/776,871

(22) Filed: Jan. 30, 2020

(65) Prior Publication Data

US 2020/0267681 A1 Aug. 20, 2020

Related U.S. Application Data

(60) Provisional application No. 62/807,487, filed on Feb. 19, 2019.

(51) Int. Cl.
*H04W 64/00* (2009.01)
*G01S 5/02* (2010.01)
(Continued)

(52) U.S. Cl.
CPC .......... *H04W 64/00* (2013.01); *G01S 5/0273* (2013.01); *G01S 5/0278* (2013.01); *H04B 7/02* (2013.01);
(Continued)

(58) Field of Classification Search
CPC ...... G01S 19/46; G01S 5/0218; G01S 5/0236; G01S 5/0242; G01S 5/02521;
(Continued)

(56) References Cited

U.S. PATENT DOCUMENTS

2010/0150117 A1* 6/2010 Aweya ............... G01S 5/14
370/338
2014/0221005 A1 8/2014 Marshall et al.
(Continued)

FOREIGN PATENT DOCUMENTS

CN 107241797 A 10/2017
CN 108549049 A 9/2018

OTHER PUBLICATIONS

Partial International Search Report—PCT/US2020/016147—ISA/EPO—May 27, 2020.
(Continued)

*Primary Examiner* — Charles N Appiah
*Assistant Examiner* — Nicole M Louis-Fils
(74) *Attorney, Agent, or Firm* — Procopio, Cory, Hargreaves & Savitch LLP

(57) ABSTRACT

Position determination of a user equipment (UE) is supported using channel measurements obtained for Wireless Access Points (WAPs), wherein the channel measurements are for Line of Sight (LOS) and Non-LOS (NLOS) signals. Based on WAP almanac information and the channel measurements, channel parameters indicative of positions of signal sources relative to a first position of a UE may be determined. Using the first position of the UE and an association of the signal sources with corresponding channel parameters, a second position of the UE may be determined. The position of the UE may be a probability density function. Additionally, position information for signal sources may be determined, such as a probability density function, as well as signal blockage probability and an antenna geometry and the WAP almanac information may be updated accordingly.

44 Claims, 14 Drawing Sheets

(51) Int. Cl.
    *G01S 19/46* (2010.01)
    *H04B 7/02* (2018.01)
    *H04B 17/27* (2015.01)
    *H04W 84/12* (2009.01)

(52) U.S. Cl.
    CPC .............. *H04B 17/27* (2015.01); *G01S 19/46* (2013.01); *H04W 84/12* (2013.01)

(58) Field of Classification Search
    CPC ..... G01S 5/0273; G01S 5/0278; H04B 17/27; H04B 7/02; H04W 64/00; H04W 84/12
    See application file for complete search history.

(56) References Cited

U.S. PATENT DOCUMENTS

| | | |
|---|---|---|
| 2014/0323163 A1 | 10/2014 | Venkatraman et al. |
| 2015/0326704 A1* | 11/2015 | Ko ................... H04M 1/72457 455/456.3 |
| 2016/0146922 A1* | 5/2016 | Moshfeghi ............ H04W 64/00 455/456.6 |
| 2017/0091223 A1* | 3/2017 | Arslan ................... G01S 5/0242 |
| 2017/0154529 A1* | 6/2017 | Zhao ......................... G08G 1/07 |
| 2017/0164157 A1* | 6/2017 | Rowitch ............... G01S 5/0246 |
| 2017/0171762 A1* | 6/2017 | Reis ....................... H04W 64/00 |
| 2018/0156888 A1* | 6/2018 | Moshfeghi ............ H04W 4/029 |
| 2018/0324738 A1* | 11/2018 | Stirling-Gallacher .... G01S 1/54 |
| 2019/0113966 A1* | 4/2019 | Connellan ............. G06F 3/0346 |
| 2020/0175405 A1* | 6/2020 | Omer ..................... H04W 12/63 |
| 2020/0200916 A1* | 6/2020 | Berggren ............... G01C 21/16 |
| 2021/0329416 A1* | 10/2021 | Li ........................ H04B 17/318 |

OTHER PUBLICATIONS

International Search Report and Written Opinion—PCT/US2020/016147—ISA/EPO—Jul. 31, 2020.

* cited by examiner

SYSTEMS AND METHODS FOR POSITIONING WITH CHANNEL MEASUREMENTS

CROSS-REFERENCE TO RELATED APPLICATIONS

This application claims the benefit of U.S. Provisional Application No. 62/807,487, entitled "SYSTEMS AND METHODS FOR POSITIONING WITH CHANNEL MEASUREMENTS," filed Feb. 19, 2019, which is assigned to the assignee hereof and which is expressly incorporated herein by reference in its entirety.

TECHNICAL FIELD

The present disclosure relates generally to communication, and more specifically to techniques for supporting location determination for user equipments (UEs).

BACKGROUND

Typical positioning solutions in wireless networks rely on techniques based on trilateration or variants thereof. The terms "position" and "location" are used interchangeably herein. In trilateration, the location of a User Equipment (UE) may be determined by determining distances between the UE and a plurality of spatially separated wireless access points. Many traditional positioning solutions are limited because they rely on line-of-sight (LOS) channel measurements to derive metrics used for positioning. These LOS measurements/metrics may include time-of-flight (TOF) or Round Trip Time (RTT), time-of-arrival (TOA), time difference of arrival (TDOA), angle of arrival (AOA), Angle of Departure (AOD), etc. However, information in Non-LOS (NLOS) channel taps that occur with multipath may also contain useful information for positioning. Many traditional techniques do not use information in NLOS signals for positioning purposes. Instead, traditional systems typically treat multipath signals as a source of positioning error and/or signal quality degradation and attempt to mitigate the effects of multipath. Techniques for utilizing information in NLOS signals advantageously for positioning are therefore desirable.

SUMMARY

Position determination of a user equipment (UE) is supported using channel measurements obtained for Wireless Access Points (WAPs), wherein the channel measurements are for Line of Sight (LOS) and Non-LOS (NLOS) signals. Based on WAP almanac information and the channel measurements, channel parameters indicative of positions of signal sources relative to a first position of a UE may be determined. Using the first position of the UE and an association of the signal sources with corresponding channel parameters, a second position of the UE may be determined. The position of the UE may be a probability density function. Additionally, position information for signal sources may be determined, such as a probability density function, as well as signal blockage probability and an antenna geometry and the WAP almanac information may be updated accordingly.

In some implementations, a method to support position determination includes: obtaining a plurality of channel measurements for at least one Wireless Access Point (WAP), wherein a channel comprises Line of Sight (LOS) and Non-LOS (NLOS) signals; determining, based on WAP almanac information and the plurality of channel measurements for the at least one WAP, at least one corresponding set of channel parameters, wherein the channel parameters are indicative of positions of a plurality of signal sources relative to a first position information of a User Equipment (UE); associating the plurality of signal sources with corresponding channel parameters in the at least one set of channel parameters; and determining, based on the first position information of the UE and the association of the plurality of signal sources with corresponding channel parameters, a second position information of the UE.

In some implementations, an entity in a wireless network configured to support position determination includes an external interface configured to communicate with entities in the wireless network; at least one memory; and at least one processor coupled to the external interface and the at least one memory, the at least one processor configured to: obtain a plurality of channel measurements for at least one Wireless Access Point (WAP), wherein a channel comprises Line of Sight (LOS) and Non-LOS (NLOS) signals; determine, based on WAP almanac information and the plurality of channel measurements for the at least one WAP, at least one corresponding set of channel parameters, wherein the channel parameters are indicative of positions of a plurality of signal sources relative to a first position information of a User Equipment (UE); associate the plurality of signal sources with corresponding channel parameters in the at least one set of channel parameters; and determine, based on the first position information of the UE and the association of the plurality of signal sources with corresponding channel parameters, a second position information of the UE.

In one implementation, a method to support position determination includes receiving a first signal source information for a plurality of signal sources over a period of time, wherein the first signal source information comprises, for each of the plurality of signal sources, a corresponding signal source position information, a corresponding signal blockage probability information, a corresponding signal source observation position, and a timestamp indicating a time of observation; generating at least one set of signal source information corresponding to at least one signal source in the plurality of signal sources by aggregating the first signal source information corresponding to the at least one signal source; and updating Wireless Access Point (WAP) almanac information with the at least one set of signal source information.

In one implementation, an entity in a wireless network configured to support position determination includes an external interface configured to communicate with entities in the wireless network; at least one memory; and at least one processor coupled to the external interface and the at least one memory, the at least one processor configured to: receive a first signal source information for a plurality of signal sources over a period of time, wherein the first signal source information comprises, for each of the plurality of signal sources, a corresponding signal source position information, a corresponding signal blockage probability information, a corresponding signal source observation position, and a timestamp indicating a time of observation; generate at least one set of signal source information corresponding to at least one signal source in the plurality of signal sources by aggregating the first signal source information corresponding to the at least one signal source; and update Wireless Access Point (WAP) almanac information with the at least one set of signal source information.

Figure 1A:
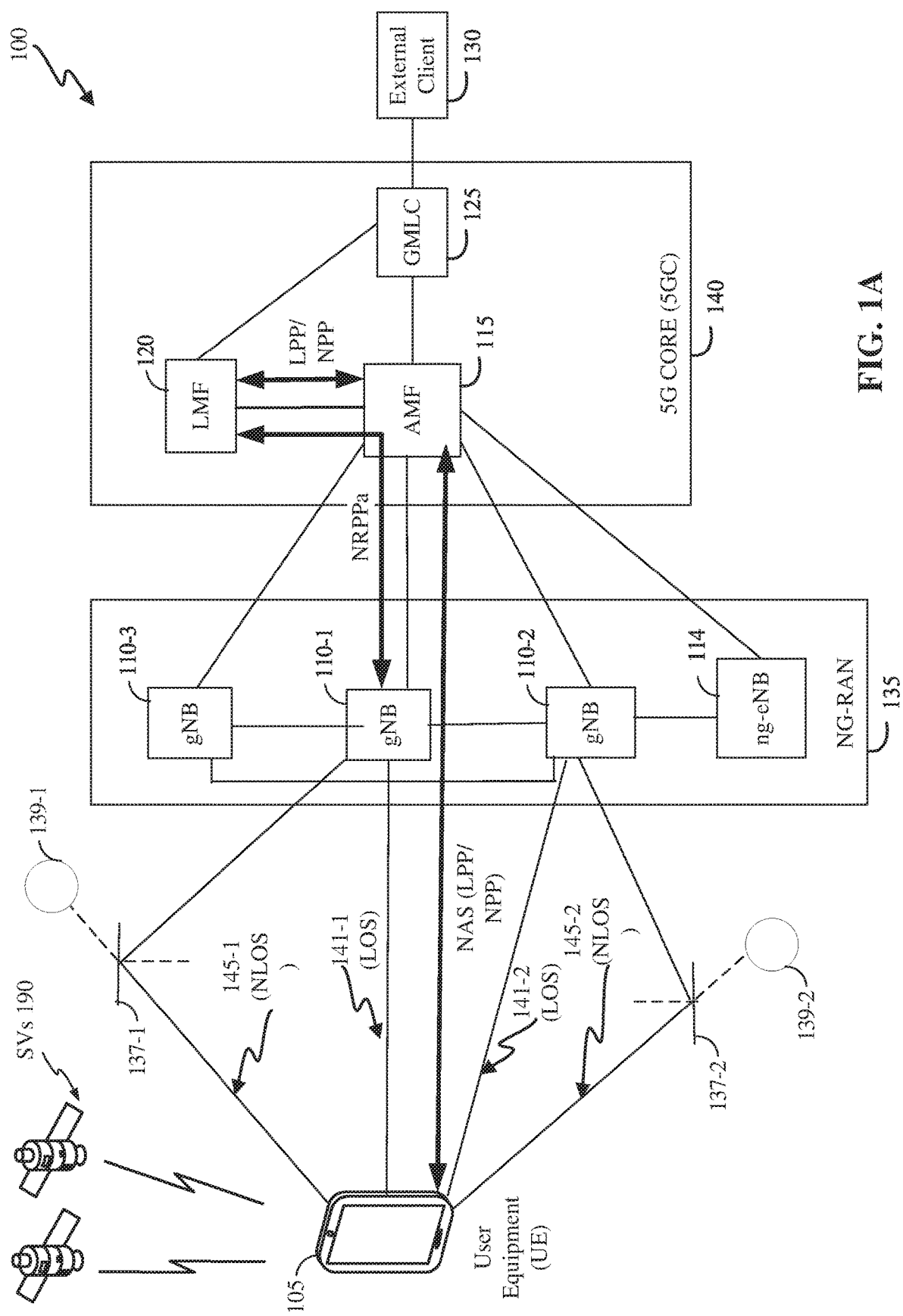
FIG. 1A is a diagram of an example communication system that may utilize a 5G network to determine a position for a mobile device and/or determine position and other information related to signal sources, according to an embodiment.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2, and/or 110-3).

DETAILED DESCRIPTION

Many traditional techniques do not use information in NLOS signals for positioning purposes. Instead, traditional systems typically treat multipath signals as a source of positioning error and/or signal quality degradation and attempt to mitigate the effects of multipath. Because multipath signals are reflected, multipath signals will experience delay relative to an LOS transmitted signal. The term "NLOS channel tap" may refer to a multipath signal that meets some specified delay criteria relative to a corresponding LOS signal (e.g. from the same WAP). The term NLOS may refer to a channel where the signal received (e.g. by a UE) has been reflected. In areas such as urban canyons with a large number of structures, or indoor spaces with a number of interior walls, a large number of NLOS signals may be present. Techniques for utilizing information in NLOS signals advantageously for positioning are therefore desirable because NLOS taps are often generated via reflections off stationary objects (e.g. walls, buildings etc.), which are often invariant over time. Therefore, using the known locations of wireless access points (WAPs), NLOS signals can be used to infer information about the locations of reflectors. In addition, when locations and other information about environmental features are known, position determination may be possible with a lower number of visible WAPs compared to conventional trilateration based techniques. However, the utilization of NLOS measurements has hitherto been challenging because the surrounding geometry (e.g. location of reflectors) is unknown and can be difficult and expensive, in terms of both cost and resources, to determine through surveys on an ongoing basis.

In addition, channel measurements of NLOS signals can also be exploited to improve positioning accuracy. For example, TOA measurements from different base stations (BS') received at a UE can experience errors because of timing synchronization issues (e.g. between the BS' and UE) and other implementation issues (e.g. undocumented changes in BS antenna locations and/or BS antenna configuration), which can limit accuracy. On the other hand, channel measurements, such as time delays between LOS and NLOS signals from the same WAP measured at the same UE share the same (e.g. BS-UE) timing synchronization errors. These errors cancel out when determining TOA differences between the LOS path and the NLOS path. Thus, TOA differences between the LOS path and the NLOS path (from a WAP) measured at a UE exhibit greater accuracy.

Accordingly, some disclosed embodiments use channel measurements, which may include LOS and NLOS signals, along with WAP almanac information (e.g., pertaining to environmental features, antenna locations and/or antenna geometry) to facilitate determination of UE position information, determine and/or update signal source position information, and determine a signal source blockage probability. The channel measurements may include measurements of LOS and NLOS (or multipath) signals in communication channels between a UE and signal sources. Channel parameters obtained from channel measurements may be associated with signal sources based on WAP almanac information and used to determine a position information for the UE, and/or determine and/or update signal source position information, and/or determine a signal source blockage probability.

In some embodiments, location assistance information provided to UE may include WAP almanac information. The WAP almanac may be stored, maintained, and/or updated at a UE and/or at the WAP and/or at a network entity (e.g. a location server or other entity) associated with the WAP, and/or any combination of the above. The WAP almanac may include map or area geometry information for an area (e.g. environmental features such locations of structures etc. that may affect RF propagation), and RF information for WAPs in the area and associated with map locations. The WAP almanac information may provide information about signal sources visible from a map location, signal source identifiers, likely signal source locations, signal blockage probabilities, signal blockage areas, signal reflection points, etc., affecting Radio Frequency (RF) propagation. Antenna geometry information may include information about the locations of antenna(s), physical antenna port identifiers (PAP IDs), the spatial distribution of antennas (for multi-antenna systems), antenna array orientation, antenna spacing, etc. In some embodiments, the WAP almanac information may be updated periodically by correlating determined positions of UEs over the time period with information related to signal sources, signal blockage probabilities for the signal sources, antenna geometries, etc.

In some embodiments, a Bayesian filter may be used determine one or more of: position of the UE, positions of signal sources, signal blockage probabilities for signal sources, and/or wireless access point (WAP) antenna geometry. For example, the Bayesian filter may use one or more of: (a) map information relating to signal sources, (b) a prior position information of the UE (e.g. from a previous iteration of the filter), (c) information derived from channel measurements (e.g. a mapping of channel parameters to signal sources), (d) a predicted blockage probability for signal sources (e.g. from a previous iteration of the filter) and a temporal-space model for blockage evolution to determine (or update): (i) position information of the UE, (ii) position information corresponding to signal sources, (iii) signal blockage probabilities for signal sources, and/or (iv) WAP antenna geometry. In some embodiments, the information determined above may be used to update map information. In some embodiments, the Bayesian filter may optionally, use one or more of: UE inertial measurements, and/or a UE motion model as input. In some embodiments, one or more of: a radio frequency (RF) survey, available environmental map information (e.g. locations of WAPs and/or locations of walls, partitions, structures environmental features, and/or other reflectors), and/or known antenna geometries (e.g. for antennas associated with a WAP), can be used to determine or initialize the WAP almanac information. An RF survey may be used to correlate channel characteristics with positions and, in some instances, may include RF fingerprinting.

A Bayesian filter provides a probabilistic estimate of the state of a dynamic system state based on noisy measurements. For example, the probabilistic estimate may pertain to one or more of: a location of a UE, locations of signal sources, and/or signal blockage probability. In a Bayesian filter, the system state $S_t$ at a time t may be represented by a set of random variables $r_t$ and the belief, which represents the uncertainty, is given by probability distribution over $r_t$. A Bayesian filter iteratively estimates such beliefs over the state space conditioned on all information in the sensor data. For example, if UE position is being determined, the Bayesian filter may be viewed as responsive to a question pertaining to the probability that the UE is at a location r given a history of prior sensor measurements, for all possible locations r.

For efficiency reasons, Bayesian filters typically assume that the current state variable $r_t$ includes all relevant information. For example, the Bayesian filter may assume that the sensor measurements depend only the UEs current position at time t, and that the UEs location at time t depends only on the previous state $r_{t-1}$ at time (t−1). States prior to (t−1) may be ignored (i.e. assumed to provide no additional information). In some embodiments, a motion model of UE (when available) and/or inertial sensor measurements may be used as input to the Bayesian filter. The UE motion model and/or inertial sensor measurements may indicate the UE location at time t given the UEs location at time (t−1). In some disclosed embodiments, an efficient approximation of the Bayesian filter may be implemented by leveraging Extended Kalman Filter (EKF) and Gaussian Mixture Models (GMM).

The term "position information" as used herein may relate to any information pertaining to a position such as positional coordinates relative to some reference, a probability density function of the position, etc. A probability density function (PDF) for a continuous random variable outputs a value that at any given sample in the sample space provides a relative likelihood that the value of the random variable would equal that sample. Position information may also be referred to as a location, location estimate, location fix, fix, position, position estimate or position fix, and may be geographic, thus providing location coordinates (e.g., latitude and longitude) which may or may not include an altitude component (e.g., height above or below some reference such as sea level, ground level, floor level, or basement level). Alternatively, a location may be expressed as a civic location (e.g., as a postal address or the designation of some point or small area in a building such as a particular room or floor). A location may also be expressed as an area or volume (defined either geographically or in civic form) within which the entity in question is expected to be located with some probability or confidence level (e.g., 67%, 95%, etc.). A location may further be expressed as a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the terms position, position information, location, or location information may comprise one or more of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level). In some embodiments, In some embodiments, the position information for an object may comprise a pose of the object. The pose of an object may refer to a position and orientation of the object with respect to a reference system. The pose of an object may refer to the position (e.g. X, Y, Z coordinates) and orientation (e.g. roll, pitch, yaw) and may be determined in up to six degrees of freedom (6-DOF). For example, the pose of a UE may be specified in terms of a 6-DOF pose relative to some known reference system.

The term "signal source" is used to refer to both a real or physical signal source (such as a transmitter) when LOS conditions exist in a channel, or to a virtual signal source (e.g. associated with a reflector), when NLOS conditions exist for the corresponding channel. When signals from a real signal source are reflected at a reflector, the signals may appear, at the receiver, to arrive along a different path and may be seen as originating from a virtual signal source. The term "virtual access point" (VAP) is sometimes used to refer to a virtual signal source. Because reflections may depend on the position of the UE relative to reflecting surfaces such as walls, buildings, and other environmental features, virtual signal sources or VAPs may appear (e.g. activated) or disappear (e.g. deactivated) as the UE moves through an area.

Some disclosed embodiments also pertain to a UE and/or another network entity (such as a location server) that may use UE position information (e.g. a probability density function of the UE position) to determine or predict VAP or virtual signal source activations (e.g. virtual signal sources visible to the UE at its estimated location). In some embodiments, the functionality described herein may be performed by UE and/or by another network entity (e.g. a location server), and/or distributed between the UE and the other network entity. For example, UE may obtain channel measurements, determine its position, and determine and update WAP almanac information locally. As another example, a network entity may obtain information based on channel measurements (e.g. from one or more UEs), determine UE position(s), and determine and update WAP almanac information over time. In some embodiments, the aggregated WAP almanac information (e.g. based on channel measurements obtained from a plurality of UEs over time) may be provided to UE as location assistance data (e.g. by a location server and/or another network entity).

In some embodiments, UE position information may be determined by obtaining a plurality of channel measurements from one or more signal sources, where each channel may include LOS and NLOS signals. Further, channel parameters may be determined from the channel measurements and, based on WAP almanac information, geometric parameters that relate the relative position of the UE to each signal source may be determined. The channel parameters may be associated with corresponding signal sources and a Bayesian filter may be used to determine and/or update position information of the UE, signal source positions, and signal blockage probability for the signal sources.

FIG. 1A is a diagram of an example communication system that may utilize a 5G network to determine a position for a mobile device and/or determine position and other information related to signal sources, according to an embodiment. The communication system 100 comprises a UE 105 and components of a Fifth Generation (5G) network comprising a Next Generation Radio Access Network (NG-RAN) 135, which includes base stations (BSs) sometimes referred to as New Radio (NR) NodeBs or gNBs 110-1, 110-2 and 110-3 (collectively and generically referred to herein as gNBs 110), and a 5G Core Network (5GCN) 140 that is in communication with an external client 130. A 5G network may also be referred to as a New Radio (NR) network; NG-RAN 135 may be referred to as an NR RAN or a 5G RAN; and 5GCN 140 may be referred to as an Next Generation (NG) Core network (NGC). Standardization of an NG-RAN and 5GCN is ongoing in the Third Generation Partnership Project (3GPP). Accordingly, NG-RAN 135 and 5GCN 140 may conform to current or future standards for 5G support from 3GPP. The communication system 100 may further utilize information from space vehicles (SVs) 190 for a Global Navigation Satellite System (GNSS) like GPS, GLONASS, Galileo, or Beidou or some other local or regional Satellite Positioning System (SPS) such as IRNSS, EGNOS, or WAAS. Additional components of the communication system 100 are described below. The communication system 100 may include additional or alternative components.

It should be noted that FIG. 1A provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections, which may include additional (intermediary) components, direct or indirect physical and/or wireless connections, and/or additional networks. Furthermore, components may be rearranged, combined, separated, substituted, and/or omitted, depending on desired functionality.

While FIG. 1A illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 135 is sometimes referred to herein as an AN or as a RAN, denoted by the term "(R)AN" or "(R)AN 135". In the case of an AN (e.g. IEEE 802.11 AN), the AN may be connected to a Non-3GPP Interworking Function (N3IWF) (e.g. in 5GCN 140) (not shown in FIG. 1A), with the N3IWF connected to AMF 115. The term "Wireless Access Point" (WAP) is also used to refer generically to an access point to an NG-RAN (e.g. base station antenna(s) or transmission point(s) (TPs), which may be coupled to gNBs 110), or access point to an AN in a Wireless Local Area Network (WLAN), which may be IEEE 802.11 based.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GCN 140), etc. The UE 105 may also support wireless communication using a WLAN (e.g. based on the IEEE 802.11 standard or variants thereof), which may connect to other networks (e.g. the Internet) using a Digital Subscriber Line (DSL) or packet cable for example. The use of one or more of these RATs may allow the UE 105 to communicate with an external client 130 (e.g. via elements of 5GCN 140 not shown in FIG. 1A, or possibly via a Gateway Mobile Location Center (GMLC) 125, and/or allow the external client 130 to receive location information regarding the UE 105 (e.g., via the GMLC 125).

The UE 105 may enter a connected state with a wireless communication network that may include the NG-RAN 135. In one example, the UE 105 may communicate with a cellular communication network by transmitting wireless signals to, or receiving wireless signals from a cellular transceiver, in the NG-RAN 135, such as a gNB 110. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110). UE 105 or a separate location server (e.g. LMF 120), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Time Difference of Arrival (TDOA), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations, or relative to four or more SVs 190 with accurately known orbital data, or combinations thereof, based at least in part, on pilots, positioning reference signals (PRS) or other positioning related signals transmitted by the transmitters or satellites and received at the UE 105. In some embodiments, UEs 105 may receive assistance data, which may include OTDOA assistance data and/or PRS assistance data to facilitate signal measurement and position determination.

As another example, location related measurements obtained by UE 105 may include angular measurements, such as the Angle of Arrival (AOA) of received signals. The term "Angle of Arrival" (AOA) refers to a direction of propagation of a radio-frequency wave incident on an antenna array relative to orientation of the antenna array. As one example, AOA may be determined based on the Time Difference of Arrival (TDOA) or phase difference measurements of a radio wave received at individual elements of an antenna array. Conversely, the term "Angle of Departure" (AOD) refers to a direction of propagation of a radio-frequency wave transmitted from an antenna array relative to orientation of the antenna array. In some embodiments, AOA and AOD measurements may be measured based on signals exchanged with WAPs such as gNBs 110 For example, when gNB supports Multiple-In Multiple Out (MIMO) including Multi-User MIMO (MU-MIMO), UE 105 and/or another network entity may obtain angular measurements. In some embodiments, UE 105 and/or another network entity may determine UE position information based on the angular measurements. In some embodiments, WAP almanac information may include information pertaining to antenna geometry, which, in some instances, may be stored locally on UEs 105 and/or obtained by UEs 105 as location assistance information.

A location server, such as the LMF 120, may be capable of providing positioning assistance data to UE 105 including, for example, WAP almanac information, information pertaining to the signals to be measured (e.g., expected signal timing, signal coding, signal frequencies, signal Doppler), locations and identities of terrestrial transmitters and/or WAPs (e.g. gNBs 110) and/or signal, timing and orbital information for GNSS SVs 190 (e.g. terrestrial almanac data or GNSS satellite data such as GNSS Almanac and/or GNSS Ephemeris information), PRS related information, etc. to facilitate positioning techniques such as A-GNSS, AFLT, OTDOA and ECID.

In some embodiments, a location server, such as the LMF 120 and/or another network entity may provide WAP almanac information pertaining to signal sources. A channel may comprise a mix of LOS and NLOS (or multipath) signals. When LOS conditions exist between a WAP and UE 105, a communication channel may include LOS signals from the transmitter. For example, when LOS conditions exist between gNB 110-1 or gNB 110-2 and UE 105, then, the corresponding LOS signals from gNB 110-1 and gNB 110-2 may travel across LOS paths 141-1 or 141-2, respectively. Accordingly, the receiver (e.g. UE 105) may determine gNB 110-1 and gNB 110-2 to be the signal sources associated with channel 141-1 and channel 141-2, respectively.

Further, NLOS signals between a WAP and UE 105 may be reflected and arrive at the receiver indirectly via a different path. Because the NLOS path is longer, the NLOS signals may be delayed relative to an LOS signal from the same transmitter. For example, reflector 137-1 and reflector 137-2 (e.g. wall surfaces) may reflect signals from gNB 110-1 and gNB 110-2, respectively. The signals from gNB 110-1 and gNB 110-2 may arrive at the receiver UE 105 via NLOS paths 145-1 and 145-2, respectively. Accordingly, in some embodiments, UE 105 (the receiver) may determine (virtual) signal sources 139-1 and 139-2 to be signal sources associated with channels 145-1 and 145-2. In FIG. 1A, the locations of virtual signal sources 139 are not drawn to scale. The term "signal source" may refer to real signal source or a physical signal source (such as gNB 110-1 or gNB 110-2) when LOS conditions exist in a channel (e.g. LOS path 141-1 or LOS path 141-2, respectively), or to a virtual signal source or a VAP (e.g. virtual signal source 139-1 or 139-2), when NLOS conditions exist for the corresponding channel (e.g. NLOS path 145-1 or NLOS path 145-2, respectively). The term "signal source" may refer to both real and virtual signal sources. Thus, a signal source can be associated with a path (LOS or NLOS) and a WAP transmitting the corresponding signal.

In some embodiments, LMF 120 and/or another network entity may obtain and/or provide location assistance information to UE 105. The location assistance information may include one or more of: WAP almanac information related to an area around UE 105. The WAP almanac information may include one or more of: known or determined position information for the signal sources (e.g. 110-1, 110-2, 139-1, 139-2 etc.), known or determined signal source blockage probability (e.g. relative to a current or prior UE position and/or motion), known or determined antenna geometry information (e.g. for multi-antenna and/or Multiple-In Multiple-Out (MIMO) configurations), known or determined locations of environmental features that affect RF propagation such as reflectors (e.g. 137-1 and/or 137-2), etc. For example, when WAPs (e.g. gNBs 110) support MIMO transmissions (such as Single-User MIMO (SU-MIMO) or Multi-User MIMO (MU-MIMO)) using antenna arrays associated with the WAP, then, the location assistance information may, in some instances, include antenna geometry information. MIMO facilitates parallel delivery of multiple spatially multiplexed data signals, which are referred to as multiple spatial streams. In MU-MIMO, a WAP may simultaneously transmit to multiple client UEs and beamforming may be used for directional signal transmission or reception. In beamforming, elements in a phased array antenna are combined so that signals at some angles experience constructive interference, while others experience destructive interference. Beamforming can be used to achieve spatial selectivity at the transmitting and receiving ends. Knowledge of antenna geometry may facilitate determination of channel measurements, including Angle of Arrival (AOA), Angle of Departure (AOD), generic phase vectors, etc. In some embodiments, newly determined information (e.g. position information relating to reflectors 137, position information relating to signal sources 139, signal source blockage probability, antenna geometry information, etc.) may be aggregated over some time period and used to update existing WAP almanac information using techniques disclosed herein.

In some embodiments, the location assistance information may be used by UE 105 and/or another network entity to determine the position of UE 105. Positioning techniques may also be facilitated by measurements obtained by UE 105 such as inertial measurements, which may include velocity (speed and direction of travel) and/or rotational parameters. Inertial measurements may be obtained by sensors (such as an Inertial Measurement Unit (IMU)) on UE 105. In some embodiments, UE 105 and/or another network entity may use an estimated position of UE 105, a UE motion model (when available) and/or a temporal-space model for signal blockage evolution (when available), and/or UE inertial measurements to predict signal blockage probability. For example, UE motion models and/or a temporal-space model for signal blockage evolution may be known or available for robots, drones, or other vehicles (e.g. in a warehouse), whose movements/motion may be programmed and/or known.

UE position determination may be facilitated by improving signal acquisition and measurement accuracy by UE 105 and, in some cases, enabling UE 105 to compute its estimated location based on the channel measurements and location assistance data. For example, a location server (e.g. LMF 120) may comprise a WAP almanac which indicates locations and identities of cellular transceivers and/or local transceivers in a particular region or regions such as a particular venue, and may provide information descriptive of signals transmitted by a WAP such as a cellular base station (e.g. a gNB 110) such as transmission power and signal timing as location assistance data, physical antenna port identifiers (PAP IDs), antenna geometry information, etc.

A UE 105 may obtain channel measurements for one or more channels associated with a WAP. Each measured channel may include LOS signals and/or NLOS signals. Channel measurements may include one or more of: channel frequency response (CFR), channel impulse response (CIR), power delay profile (PDP), etc. For example, CIR may be obtained as the inverse Fourier transform of the CFR. The PDP is a measure of signal intensity received through a multipath channel as a function of time delay. Channel measurements may further include one or more of: of signal strengths (e.g. received signal strength indication (RSSI)) for signals received from cellular transceivers and/or local transceivers and/or may obtain a signal to noise ratio (SNR), a reference signal received power (RSRP), a reference signal received quality (RSRQ), a time of arrival (TOA), or a round trip signal propagation time (RTT) between UE 105 and a WAP (e.g. cellular transceiver such as a gNB 110 or a local transceiver such as a WiFi access point (AP)). A UE 105 may transfer these measurements to a location server, such as LMF 120, to determine a location for UE 105, or in some implementations, may use these measurements together with location assistance data received from a location server (e.g. LMF 120) or broadcast by a base station (e.g. a gNB 110) or obtained locally (e.g. via a WAP almanac on UE 105) in NG-RAN 135 to determine a location for UE 105.

In the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS, or PRS) received at UE 105 from two different transceivers. The UE 105 may return the measured RSTDs to a location server (e.g. LMF 120) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time.

As shown in FIG. 1A, pairs of gNBs 110 in NG-RAN 135 may be connected to one another, e.g., directly as shown in FIG. 1A or indirectly via other gNBs 110. Access to the 5G network is provided to UE 105 via wireless communication between the UE 105 and one or more of the gNBs 110, which may provide wireless communication access to the 5GCN 140 on behalf of the UE 105 using 5G (e.g. NR). In FIG. 1A, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughput and bandwidth to UE 105. Some gNBs 110 in FIG. 1A (e.g. gNB 110-3) may be configured to function as positioning-only beacons which may transmit signals (e.g. directional PRS) to assist positioning of UE 105 but may not receive signals from UE 105 or from other UEs.

As noted, while FIG. 1A depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GCN 140. Thus, the NG-RAN 135 may include any combination of gNBs, eNBs, or other types of base stations or access points. As an example, NG-RAN 135 may include one or more next generation eNBs (ng-eNBs) 114 which provide LTE wireless access to UE 105 and may connect to entities in 5GCN 140 such as AMF 115.

The gNBs 110 and/or the ng-eNB 114 can communicate with the Access and Mobility Management Function (AMF) 114, which, for positioning functionality, communicates with a Location Management Function (LMF) 120. The AMF 115 may support mobility of the UE 105, including cell change and handover and may participate in supporting a signaling connection to the UE 105 and possibly helping establish and release Protocol Data Unit (PDU) sessions for UE 105. Other functions of AMF 115 may include: termination of a control plane (CP) interface from NG-RAN 135; termination of Non-Access Stratum (NAS) signaling connections from UEs such as UE 105, NAS ciphering and integrity protection; registration management; connection management; reachability management; mobility management; access authentication and authorization.

The LMF 120 may support positioning of the UE 105 when UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), WLAN positioning, and/or other positioning and/or mapping methods described herein. The LMF 120 may also process location service requests for the UE 105, e.g., received from the GMLC 125. In some embodiments, a node/system that implements the LMF 120 may, additionally or alternatively, implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105). The LMF 120 may be referred to by other names such as a Location Manager (LM), Location Function (LF), commercial LMF (CLMF) or value added LMF (VLMF).

The GMLC 125 may support a location request for the UE 105 received from an external client 130 and may forward such a location request to a serving AMF 115 for UE 105, in the case of an AMF based location solution. The AMF 115 may then forward the location request to LMF 120 which may obtain one or more location estimates for UE 105 (e.g. according to the request from external client 130) and may return the location estimate(s) to AMF 115, which may return the location estimate(s) to external client 130 via GMLC 125. In an alternative LMF based location solution, the GMLC 125 may forward a location request received from external client 130 directly to the LMF 120, thereby bypassing and not impacting the serving AMF 115. The LMF 120 may then obtain one or more location estimates for UE 105 similarly to the AMF based location solution and may return the location estimate(s) directly to the GMLC 125, which may return the location estimate(s) (as for the AMF based location solution) to the external client 130.

For either an AMF based location solution or an LMF based location solution, GMLC 125 may contain subscription information for an external client 130 and may authenticate and authorize a location request for UE 105 from external client 130. GMLC 125 may further initiate a location session for UE 105 by sending a location request for UE 105 to either AMF 115 or LMF 120 (e.g. according to whether an AMF based or LMF based location solution is used) and may include in the location request an identity for UE 105 and the type of location being requested (e.g. such as a current location or a sequence of periodic or triggered locations).

As further illustrated in FIG. 1A, the LMF 120 and the gNBs 110 may communicate using a New Radio Position Protocol A (which may be referred to as NPPa or NRPPa). NRPPa may be defined in 3GPP Technical Specification (TS) 38.455 and may be the same as, similar to, or an extension of the LTE Positioning Protocol A (LPPa) defined in 3GPP TS 36.455, with NRPPa messages being transferred between the gNBs 110 and the LMF 120 via the AMF 115. As further illustrated in FIG. 1A, LMF 120 and UE 105 may communicate using the LTE Positioning Protocol (LPP) defined in 3GPP TS 36.355, where LPP messages are transferred between the UE 105 and the LMF 120 via the serving AMF 115 and a serving gNB 110-1 for UE 105. For example, LPP messages may be transferred between the LMF 120 and the AMF 115 using a transport protocol (e.g. IP based) or a service based operation (e.g. using the Hypertext Transfer Protocol (HTTP)), and may be transferred between the AMF 115 and the UE 105 using a 5G Non-Access Stratum (NAS) protocol. The LPP protocol may be used to support positioning of UE 105 using UE assisted and/or UE based position methods such as Assisted GNSS (A-GNSS), Real Time Kinematics (RTK), Wireless Local Area Network (WLAN), Observed Time Difference of Arrival (OTDOA) and/or Enhanced Cell Identity (ECID) and/or other methods described herein. The NRPPa protocol may be used to support positioning of UE 105 using network based position methods (e.g. ECID—when used with measurements obtained by a gNB 110 or received from a gNB 110 from UE 105, etc.) and/or may be used by LMF 120 to obtain location related information from gNBs 110 (e.g. parameters defining positioning reference signal (PRS) transmission from gNBs 110 for support of OTDOA, etc.).

With a UE assisted position method, UE 105 may obtain channel measurements and/or location measurements (e g channel measurements, which may include one or more of measurements of RSSI, RTT, RSTD, RSRP and/or RSRQ for gNBs 110, ng-eNB 114 or WLAN APs, or measurements of GNSS pseudorange, code phase and/or carrier phase for SVs 190) and send the measurements to a location server (e.g. LMF 120) for computation of a location estimate for UE 105, location estimates of sources 139, signal source blockage probabilities, etc. With a UE based position method, UE 105 may obtain location measurements (e.g. which may be the same as or similar to location measurements for a UE assisted position method) and may compute a location of UE 105, location estimates of sources 139, signal source blockage probabilities, etc. (e.g. with the help of assistance data stored locally on UE 105, received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. channel measurements including measurements of RSSI, RTT, RSRP, RSRQ or TOA for signals transmitted by UE 105) and/or may receive measurements obtained by UE 105, and may send the measurements to a location server (e.g. LMF 120) for computation of a location estimate for UE 105, location estimates of sources 139, signal source blockage probabilities, etc.

Information provided by the gNBs 110 to the LMF 120 using NRPPa may include timing and configuration information for PRS transmission and location coordinates of the gNBs 110, antenna geometry information (e.g. when gNBs 110 support MU-MIMO), etc. The LMF 120 can then provide some or all of this information and/or WAP almanac information to the UE 105 as assistance data in an LPP message via the NG-RAN 135 and the 5GCN 140.

An LPP message sent from the LMF 120 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA and/or some other position method. As one example, in the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 120 in an LPP message (e.g. inside a 5G NAS message) via the serving gNB 110-1 and the AMF 115.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 135 includes one or more ng-eNBs 114, an ng-eNB 114 may communicate with LMF 120 using NRPPa in order to support positioning of UE 105 (e.g. using a network based position method) and/or may enable transfer of LPP and/or NPP messages between UE 105 and LMF 120 via the ng-eNB 114 and AMF 115. An ng-eNB 114 and/or a gNB 110 in NG-RAN 135 may also broadcast positioning assistance data to UEs such as UE 105.

As described previously, an AMF based location solution uses an AMF as the main anchor point for location services for a target UE. In the case of communication system 100, an AMF based location solution would use serving AMF 115 as the main anchor point for obtaining one or more locations of UE 105. The AMF based solution may then require all location requests for UE 105 to pass through, and to be managed and coordinated by, AMF 115. An LMF based location, on the other hand, may require all location requests to pass through, and to be managed and coordinated by an LMF in the serving 5GCN for a target UE. In the case of communication system 100, an LMF based location, would use LMF 120 as the main anchor point for obtaining one or more locations of UE 105. For multiple locations of a target UE 105 based on periodic or triggered events, an LMF based solution may be preferred in terms of requiring less signaling and processing and using fewer network entities and network interfaces. The techniques disclosed herein may be applied to both LMF and AMF based solutions.

Figure 1B:
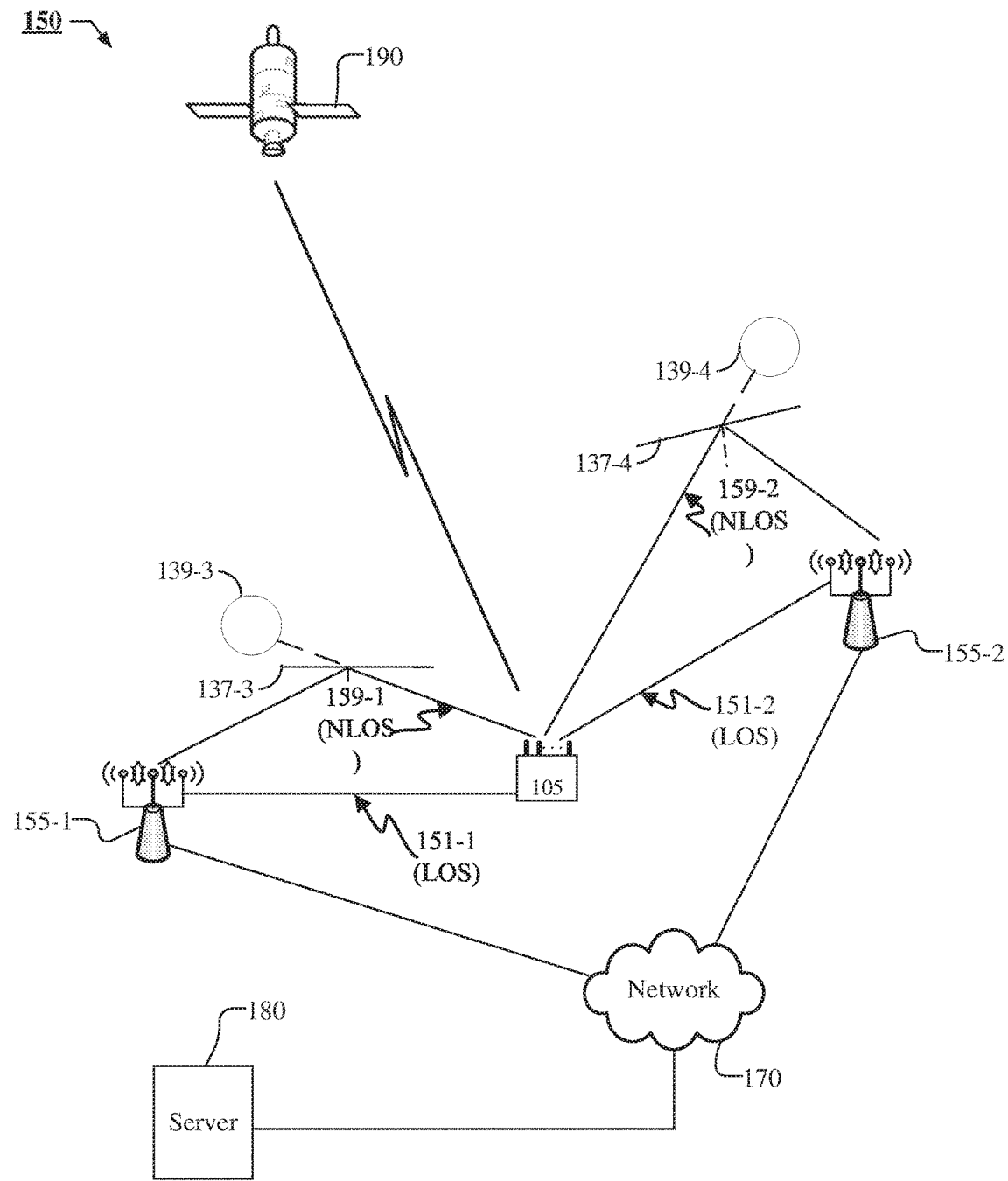
FIG. 1B is a diagram of an example WLAN communication system to facilitate determination of a position for a mobile device and/or determination of position and other information related to signal sources, according to an embodiment.

FIG. 1B is a diagram of an example WLAN communication system 150 to facilitate determination of a position for a mobile device and/or determination of position and other information related to signal sources, according to an embodiment. In some embodiments, WLAN communication system 150 may comprise a plurality of WAPs (e.g. APs 155) and may be based on the IEEE 802.11 standard (e.g. 802.11REVmc) or variants thereof. WLAN APs 155-1 and 155-2 may form part of an AN. The IEEE 802.11 standards include various protocols for channel sounding and ranging. Some versions of the IEEE 802.11 standard support MIMO including MU-MIMO. As outlined previously, in traditional systems, errors related to multipath/NLOS signals (e.g. which may prevalent in indoor environments) may limit positioning accuracy. WLAN communication system 150 may include UE 105 and APs 155, which may communicate wirelessly. In some embodiments, UEs 105 and APs 155 may communicate with server 180 using network 170. While system 150 illustrates a single UE 105 and two APs 155, the number of UEs 105 and APs 155 in system 150 may be larger.

In some embodiments, one or more UE 105 and/or APs 155 may comprise multiple antennas and may support MIMO, including MU-MIMO. For example, UE 105 and APs 155 may communicate using 802.11ac on the 5 GHz band, which may support MIMO, MU-MIMO and multiple spatial streams. In some embodiments, UEs 105 and APs 155 may communicate using some of the above standards, which may further support one or more of Very High Throughput (VHT) (as described in the above standards) and High Efficiency WLAN (HEW), and/or beamforming with standardized sounding and feedback mechanisms. In some embodiments, UE 105 and/or APs 155 may additionally support legacy standards for communication with legacy devices.

In particular implementations, the UE 105 may have circuitry and processing resources capable of obtaining location related measurements. Location related measurements obtained by UE 105 may include measurements of signals received from SVs 190 belonging to an SPS or Global Navigation Satellite System (GNSS) and/or may include measurements of signals received APs 155, which may be at known locations. UE 105 or a separate location server (e.g. server 180), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), WLAN positioning techniques (e.g. FTM), etc. or combinations thereof.

As another example, location related measurements obtained by UE 105 may include ranging and angular measurements, such as AOA, AOD, phase measurements etc. related to received signals, which may be obtained using FTM and/or other protocols supported by system 150.

A location server, such as server 180, may be capable of providing positioning assistance data to UE 105, which may include WAP almanac information. The location assistance information may also include, for example, information regarding signals to be measured (e.g., expected signal timing, signal coding, signal frequencies, signal Doppler), locations and identities of APs (e.g. APs 155) and/or signal, timing and orbital information for GNSS SVs 190 (e.g. terrestrial almanac data or GNSS satellite data such as GNSS Almanac and/or GNSS Ephemeris information) to facilitate positioning techniques such as A-GNSS, AFLT, etc. In some embodiments, a location server, such as server 180 and/or another network entity may provide WAP almanac information pertaining to signal sources.

A communication channel between AP 155 and UE 105 may include LOS and NLOS (or multipath) components. When LOS conditions exist between an AP and UE 105, a communication channel may include LOS signals from the transmitter. For example, when LOS conditions exist between AP 155-1 or AP 155-2 and UE 105 then, the corresponding LOS signals from AP 155-1 and AP 155-2 may travel across LOS path 151-1 or LOS path 151-2, respectively. Accordingly, the receiver (e.g. UE 105) may determine AP 155-1 and AP 155-2 to be the signal sources associated with LOS path 151-1 and LOS path 151-2, respectively.

Further, NLOS (multipath) signals between an AP and UE 105 may be reflected and arrive at the receiver indirectly via a different channel. Because the NLOS path is longer, the NLOS signals may be delayed relative to an LOS signal from the same transmitter. For example, reflector 137-3 and reflector 137-4 (e.g. walls or a buildings) may reflect signals from AP 155-1 and AP 155-2, respectively. The signals from AP 155-1 and AP 155-2 may arrive at the receiver UE 105 via NLOS paths 159-1 and NLOS paths 159-2, respectively. Accordingly, in some embodiments, UE 105 (the receiver) may determine virtual signal sources (or VAPs) 139-3 and 139-4 to be signal sources associated with NLOS paths 159-1 and 159-2, respectively. In FIG. 1B, the position of virtual signal sources 139 are not drawn to scale.

In some embodiments, server 180 and/or another entity coupled to network 170 may obtain and/or provide location assistance information to UE 105. The location assistance information may include one or more of: WAP almanac information related to an area around UE 105. The WAP almanac information may include one or more of: known or determined position information for the signal sources (e.g. 155-1, 155-2, 139-3, 139-4 etc.), signal source blockage probability (e.g. relative to a current or prior UE position and/or motion), available antenna geometry information (e.g. for MIMO/MU-MIMO or multi-antenna configurations), known or determined locations of environmental features affecting RF propagation such as reflectors (e.g. 137-3 and/or 137-4), etc. In some embodiments, newly determined information (e.g. position information relating to reflectors 137, position information relating to signal sources 139, signal source blockage probability, antenna geometry information, etc.) may be used to update existing WAP almanac information (e.g. on server 180 and/or UE 105) using techniques disclosed herein.

In some embodiments, the location assistance information may be used by UE 105 and/or another network entity to determine the position of UE 105, the positions of signal sources and corresponding signal blockage probabilities. Positioning techniques may also be facilitated by measurements obtained by UE 105 such as inertial measurements, which may include velocity (speed and direction of travel) and/or rotational parameters. Inertial measurements may be obtained by sensors (such as an Inertial Measurement Unit (IMU)) on UE 105. In some embodiments, UE 105 and/or another network entity may use an estimated position of UE 105, a UE motion model (when available) and/or a temporal-space model for signal blockage evolution (when available), and/or UE inertial measurements to predict signal blockage probability.

A UE 105 may obtain channel measurements for a channel associated with an AP. The channel may include LOS signals and/or NLOS signals. Channel measurements may include one or more of: channel frequency response (CFR), channel impulse response (CIR), power delay profile (PDP), etc. as previously outlined. A UE 105 may transfer these measurements to a location server, such as server 180, to determine a location for UE 105, or in some implementations, may use these measurements together with location assistance data stored locally and/or received from a location server (e.g. server 180) and/or broadcast by APs 155 to determine a location for UE 105.

Figure 2A:
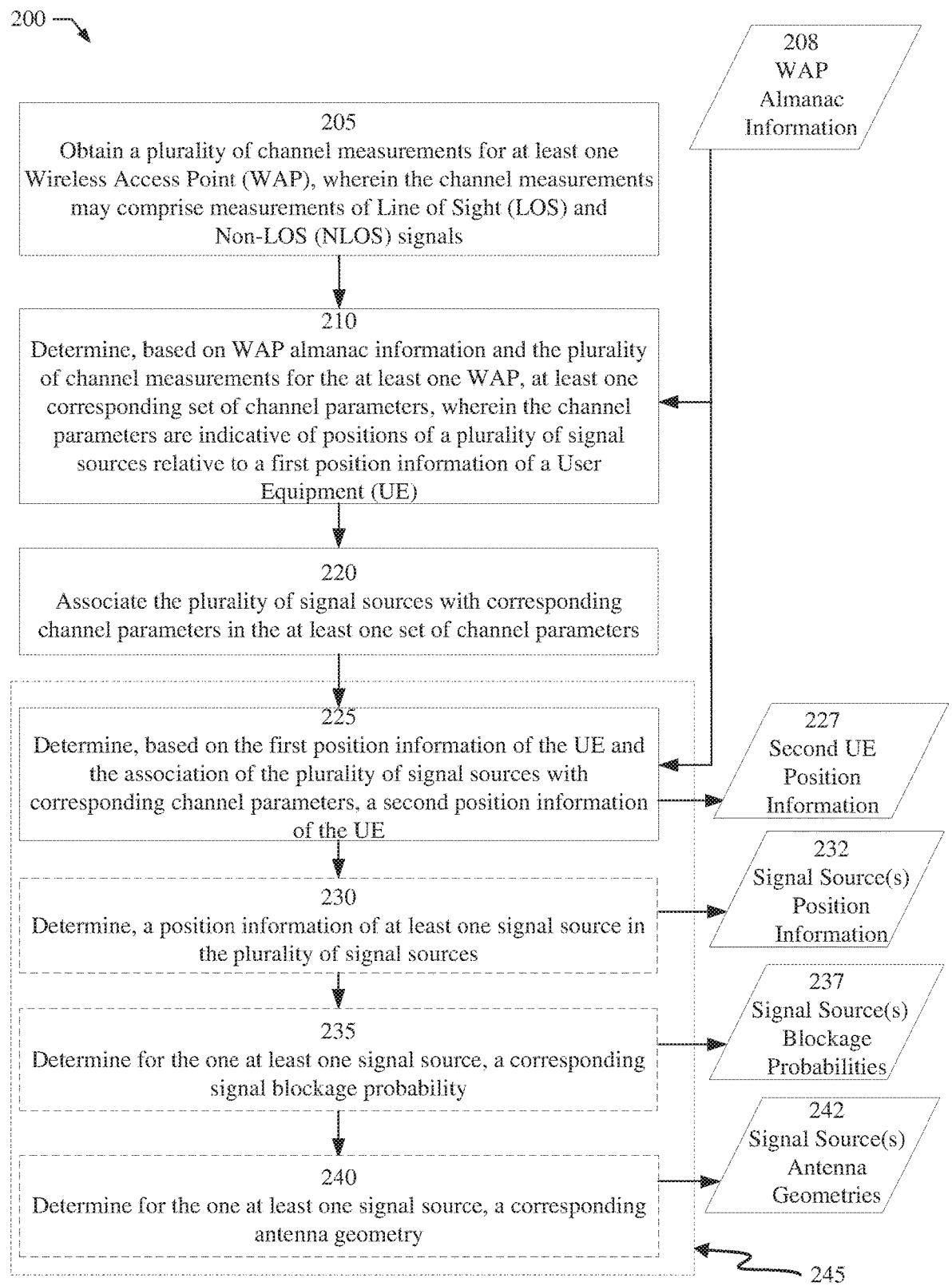
FIG. 2A shows a flowchart of a method to support UE location determination and/or signal source location determination.

FIG. 2A shows a flowchart of a method 200 to support UE location determination and/or signal source location determination. In some embodiments, method 200 may be performed by one or more of: a location server (e.g. LMF 120 in FIG. 1A or server 180 in FIG. 1B) and/or a network entity communicatively coupled to the wireless network, and/or UE 105, or some combination of the above.

In block 205, a plurality of channel measurements for at least one Wireless Access Point (WAP) may be obtained, wherein the channel comprises Line of Sight (LOS) and Non-LOS (NLOS) signals. The plurality of channel measurements are made, for example, while the UE 105 is at a first location. Each channel may be associated with a corresponding WAP (e.g. gNBs 110 and/or APs 155) of a plurality of WAPs. Channel measurements may include one or more of: channel frequency response (CFR), channel impulse response (CIR), power delay profile (PDP), channel signal strengths (e.g. RSSI), SNR, RSRP, RSRQ, TOA, TDOA, OTDOA, RTT, etc. between UE 105 and a WAP (e.g. cellular transceiver such as gNB 110 or WLAN AP 155).

In some embodiments, UE 105 may obtain channel measurements and send the measurements to a server (e.g. LMF 120 or server 180) and/or another network entity. In some embodiments, the channel measurements obtained by UE 105 may be based on location assistance information received by UE 105 from the location server (e.g. LMF 120 and/or server 180 and/or another network entity). In some embodiments, the at least one WAP may comprise at least one of: (a) Base Stations (e.g. gNBs 110) associated with a Wireless Wide Area Network (WWAN) (e.g. a 5G network), or (b) Wireless Local Area Network (WLAN) APs (e.g. APs 155), or (c) some combination thereof.

In block 210, based on WAP almanac information and the plurality of channel measurements for the at least one WAP, at least one corresponding set of channel parameters may be determined, wherein the channel parameters are indicative of positions of a plurality of signal sources relative to a first position information of a User Equipment (UE). In some embodiments, the position corresponding to a signal source may be relative to a position of the UE (e.g. UE 105), e.g., the first position of the UE at which the plurality of channel measurements were made. In some embodiments, the position corresponding to a signal source may include information about distance of the corresponding signal source from UE 105.

The channel parameters may comprise at least one of: (a) a corresponding Angle of Arrival (AOA) of a corresponding channel signal, (b) a corresponding Angle of Departure (AOD) of the corresponding channel signal, or (c) a corresponding phase vector (e.g. for multi-antenna or MU-MIMO systems), or (d) a corresponding NLOS path length for the corresponding channel signal, or (e) a combination thereof.

In some embodiments, in block 210, the signal received (e.g. by UE 105 from a WAP over the channel between the UE 105 and the WAP) may be assumed to be a superposition of up to M multi-path or NLOS components plus Additive White Gaussian Noise (AWGN). AWGN is a noise model that can be used to mimic the effect of random processes that may occur in nature and is added to any noise that might be intrinsic to the system. In some embodiments, in block 210, the NLOS components may be determined from the received signal. The received signal at each of the $N_r$ antennas may be written as $$r^{(i)}(t)=\Sigma_{m=1}^{M}\alpha_m^{i}u(t-\tau_m^{i})+n(t), i=1 \ldots N_r,$$

where:
$\alpha_m^{(i)}$ is the complex amplitude of the $l^{th}$ path for the $i^{th}$ antenna,
$\tau_m^{(i)}$ is the delay of the $l^{th}$ path for the $i^{th}$ antenna, (under a narrowband assumption so that $\tau_m^{(i)}=\tau_m \forall i=1 \ldots N_r$),
u(t) is the known modulated transmitted signal.

In some embodiments, block 210 may estimate the separate multipath or NLOS components $y_m$, given by:

$$y_m=\{|a_m|,[f_m^i:i=1 \ldots N_r],\tau_m\} \text{ for } m=1 \ldots M,$$

where: $a_m$ is the amplitude, $f_m^i$ is the phase vector, and $\tau_m$ is the delay for each NLOS component. Channel parameters may be estimated using various techniques including, but not limited to: correlation; maximum likelihood estimation; Multiple Signal Classification (MUSIC) techniques, including variants such as Root-MUSIC, Cyclic MUSIC, or Smooth MUSIC; Estimation of Signal Parameters using Rotational Invariance Techniques (ESPRIT); Matrix Pencil, Space Alternating Generalized Expectation-Maximization (SAGE), etc. In some embodiments, inertial measurements from UE 105 may be used to resolve ambiguity over time by leveraging the invariance of multi-antenna geometry.

In some embodiments, unique identifiers for each signal source, locations of the signal sources, corresponding antenna geometries, and signal blockage probabilities for each of the signal sources may be received (e.g. by UE 105) as location assistance information (e.g. from LMF 120 and/or server 180 and/or another network entity) and/or may be determined by the UE based on locally stored WAP almanac information (e.g. as determined by UE 105 and/or received from or updated by a network entity or service provider).

Figure 2B:
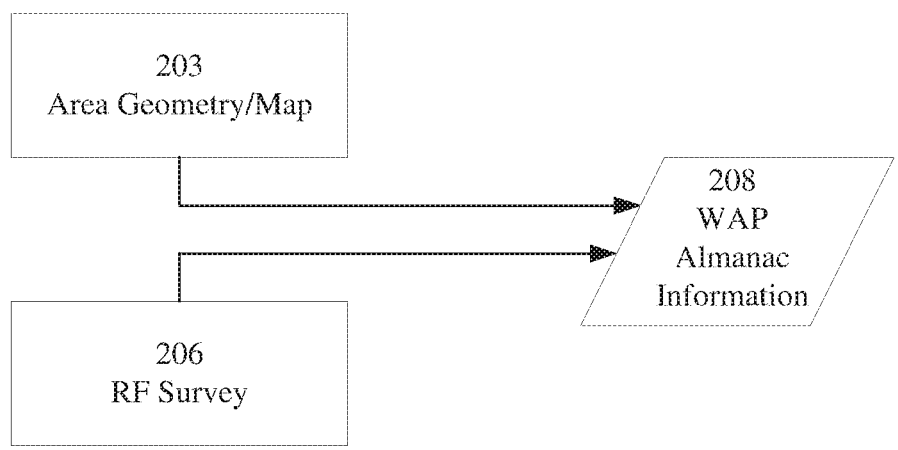
FIG. 2B shows an exemplary process for obtaining initial WAP almanac information from known area geometry and RF surveys.

FIG. 2B, shows an exemplary process for obtaining initial WAP almanac information 208. In some embodiments, the initial WAP almanac information 208 may be determined based on known area geometry 203 (e.g. physical map indicating locations of various relevant environmental features such as walls, obstructions, barriers, stairwells, elevator shafts, structures, etc.) which may affect RF propagation (e.g. by signal reflection, blocking, attenuation, etc.). Area geometry 203 may be in electronic or digital form and may obtained from any appropriate source (e.g. an online public map database, governmental information or public records, a map provided by an owner/operator of a facility such as a warehouse, building, etc.). In some embodiments, the map information may be annotated or augmented with information from RF survey 206. For example, RF survey 206 may be used to correlate signal sources visible at various map positions and provide an initial RF fingerprint (based on RF measurements) for the various locations. Each signal source may be identified using a corresponding unique signal source identifier, and WAP almanac information 208 may further include a corresponding signal source location (e.g. from known WAP location information and/or as determined using RF survey 206), and a corresponding signal blockage probability for signal sources at various map locations. WAP almanac information 208 may further include information about antenna geometry for corresponding signal sources, when the signal sources use multi-antenna configurations and/or MIMO. In some embodiments, the initial WAP almanac information 208 (e.g. based on area geometry map 203 and RF survey 206) may be updated over time based on measurements by one or more UEs 105 as outlined further herein.

Figure 2C:
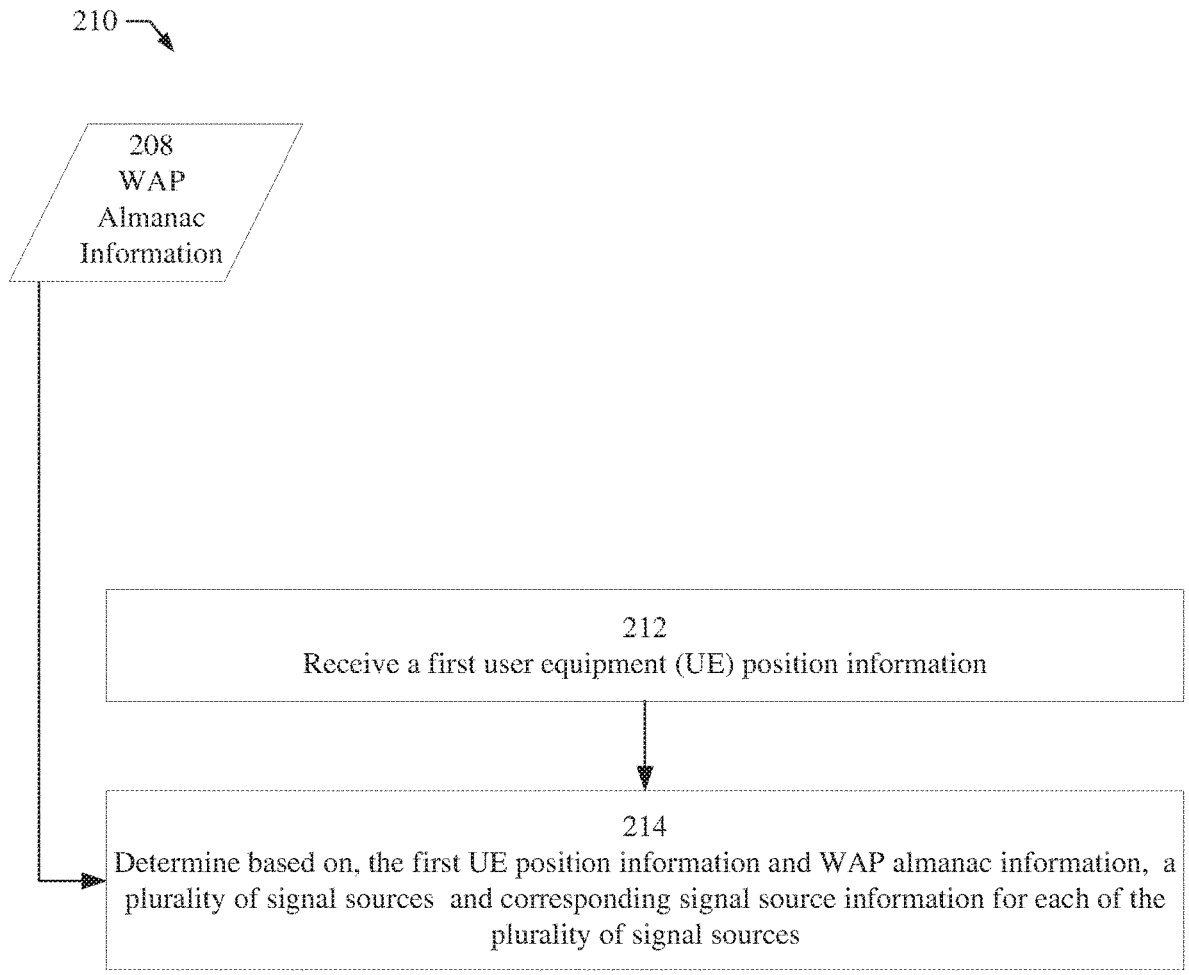
FIG. 2C shows a method of determining a set of signal sources and corresponding signal source information.

FIG. 2C, which pertains to block 210 (in FIG. 2A), shows a method of determining a set of signal sources and corresponding signal source information (e.g. a corresponding signal source identifier, a corresponding signal source location information (such as a likely location), signal source signal blockage probability, and, if applicable, a corresponding antenna geometry) according to an embodiment. Block 210 may be performed by UE 105, a location server (LMF 120 and/or server 180), another network entity, or some combination thereof.

In block 212, a first user equipment (UE) position information may be received. In some embodiments, the first UE position information may comprise a probability density function of UE position. For example, the first UE position information may be determined by the UE using any available method. In some embodiments, a previous position information of UE 105 (based on an immediately prior UE location) may be used. In some embodiments, when UE position is determined using a filtering technique (such as a Bayesian filter), a prior output (e.g. an immediately preceding output) of the filter may be used as the first UE position information.

In block 214, based on the first UE position information and WAP almanac information 208, a set of signal sources (including virtual signal sources) and corresponding signal source information for each signal source in the set may be determined. In some embodiments, the set of signal sources may be determined based on WAP almanac information 208 and may comprise signal sources that are visible or likely to be visible based on the first UE position information. For a signal source in the set, the signal source information may include a corresponding signal source identifier, a corresponding signal source location, a corresponding signal blockage probability, and, if applicable, an antenna geometry.

Referring to FIG. 2A, in block 220, the plurality of signal sources may be associated with corresponding channel parameters in the at least one set of channel parameters. In some embodiments, based on: (a) information pertaining to the plurality of signal sources and (b) the location information (e.g. geometric information) of UE 105 relative to each signal source in the plurality of signal source, and (c) information pertaining to the channel parameters (e.g. AOA, AOD, phase vectors, etc.), block 220 may provide a deterministic mapping of signal sources to channel parameters, e.g., each signal source is associated with corresponding channel parameters, or a set of possible mappings of signal sources to channel parameters, wherein each possible mapping is associated with a probability mass function.

In block 225, based on the first position information of the UE and the association of the plurality of signal sources with corresponding channel parameters, a second position information of the UE 227 may be determined. For example, the second position information of the UE may be with respect to the first position of the UE at which the plurality of channel measurements were made. In some embodiments, the second position information of the UE 227 may comprise a probability density function of UE position. In some embodiments, the probability density function may be updated over time across multiple measurement instances via a filtering procedure as outlined further below (e.g. in FIG. 2C).

In block 230, a position information of at least one signal source 232 in the plurality of signal sources may be determined. In some embodiments, the position information of the at least one signal source 232 may comprise a probability density function of a position of the at least one signal source. In some embodiments, the probability density function may be updated over time across multiple measurement instances via a filtering procedure as outlined further below (e.g. in FIG. 2C). In some embodiments, the filtering procedure may simultaneously refine and/or output the second UE position information and the at least one signal source position.

In block 235, a corresponding signal blockage probability 237 may be determined for the at least one signal source.

Further, in some embodiments, in block 240, a corresponding antenna geometry may be determined, when applicable (e.g. the at least one signal source include Multiple-In Multiple Out (MIMO) and/or a multi-antenna system).

In some embodiments, the second position information of the UE 227, the position information of the at least one signal source 232, the at least one signal source blockage probability 237, and/or the at least one signal source antenna geometry 242 may be used to update WAP almanac information 208. For example, the at least one signal source position 232, the at least one signal source blockage probability 237, and/or the at least one signal source antenna geometry 242 may be stored, aggregated over time (e.g. mathematically or statistically), ad used to update WAP almanac information 208.

In some embodiments, blocks 220 through 235 may be implemented using a Bayesian filter. In some embodiments, the Bayesian filter may be implemented by leveraging Extended Kalman Filter (EKF) and Gaussian Mixture Models. For example, in some embodiments, the second position information of the UE may be determined by providing the mapping of the plurality of channel measurements to the plurality of signal sources associated with the first position information of the UE to a Bayesian filter, wherein the Bayesian filter predicts the second position information of the UE. In some embodiments, the first position information of the UE may be determined based, on at least one of: (a) a prior predicted position of the UE provided by the Bayesian filter, and one of more of: (b) a motion model for UE motion, or (c) inertial measurements related to a velocity of the UE and to rotational parameters associated with the UE, or (d) some combination of (a) through (c) above.

Figure 2D:
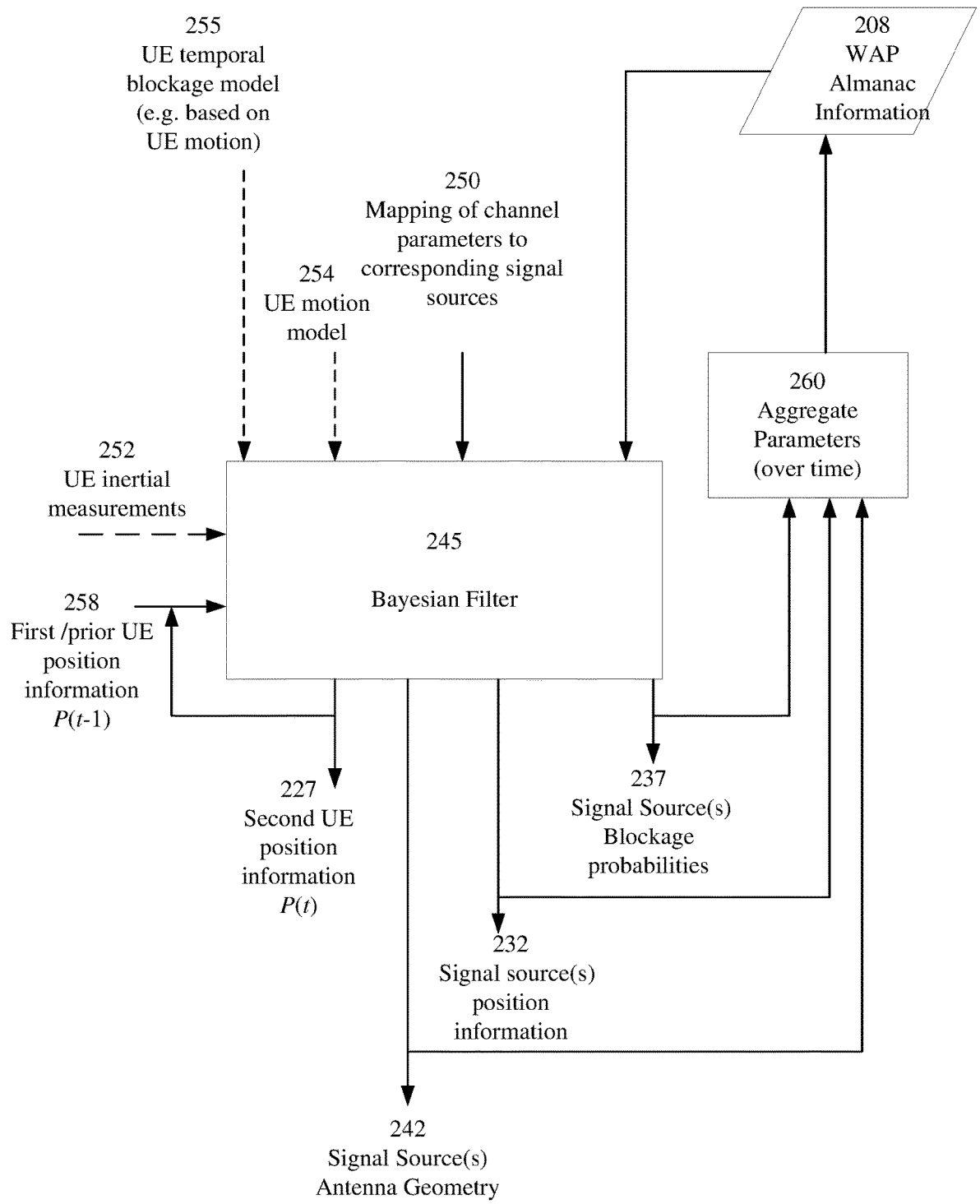
FIG. 2D shows a block diagram of an example Bayesian filter illustrating possible inputs and outputs.

FIG. 2D shows a block diagram of an example Bayesian filter 245 illustrating possible inputs and outputs of Bayesian filter 245. As shown in FIG. 2C, Bayesian filter may receive as input: (a) WAP almanac information 208, (b) a first or prior UE position information 258 (e.g. output by Bayesian filter 245 at time (t−1)), and (c) a mapping of channel parameters to signal sources 250. Bayesian filter 245 may optionally also receive one or more of: (a) UE motion model 254, (b) a UE temporal blockage model 255, which may be based on UE motion, and (c) UE inertial measurements 252, which may include measurements related to a velocity of the UE and to rotational parameters associated with the UE. In some embodiments, Bayesian filter 245 may process the inputs above and output: (i) second position information of the UE 227 (e.g. at time t), (ii) position information of the at least one signal source 232, (iii) at least one signal blockage probability corresponding to the at least one signal source and (iv) if, applicable, an antenna geometry associated with the at least one signal source.

In some embodiments, outputs (i) through (iv) above may be input to block 260, which may aggregate (e.g. mathematically or statistically) corresponding measurements over time and update WAP information 208. The mapping of positions (e.g. on a map) to corresponding visible signal sources channel parameters may be built over time. For example, based on UE position information and orientation information, the positions of visible signal sources from recent observations (e.g. output by Bayesian filter 245) may be aggregated mathematically or statistically (e.g. in block 260) and used to update WAP almanac information 208.

In some embodiments, the WAP almanac information 208, which is aggregated in block 260, may be local to UE 105 and may be updated by UE 105 (e.g. using functionality in block 260). In some embodiments, a location server (e.g. LMF 120 and/or server 180) or another network entity may maintain and update WAP almanac information and may include functionality provided by block 260. For example, UE 105 may send outputs (i) through (iv) above to the location server and/or another network entity, which may aggregate the received information over time and update WAP almanac information 208. In some embodiments, a location server (e.g. LMF 120 and/or server 180), or another network entity may aggregate information received from a plurality of UEs 105 over some time period when updating WAP almanac information 108. In embodiments where the location server and/or another network entity maintains and/or updates WAP almanac information 208, the updated WAP almanac information 208 may be sent to UEs periodically (e.g. according to some predetermined/agreed upon schedule).

Figure 3A:
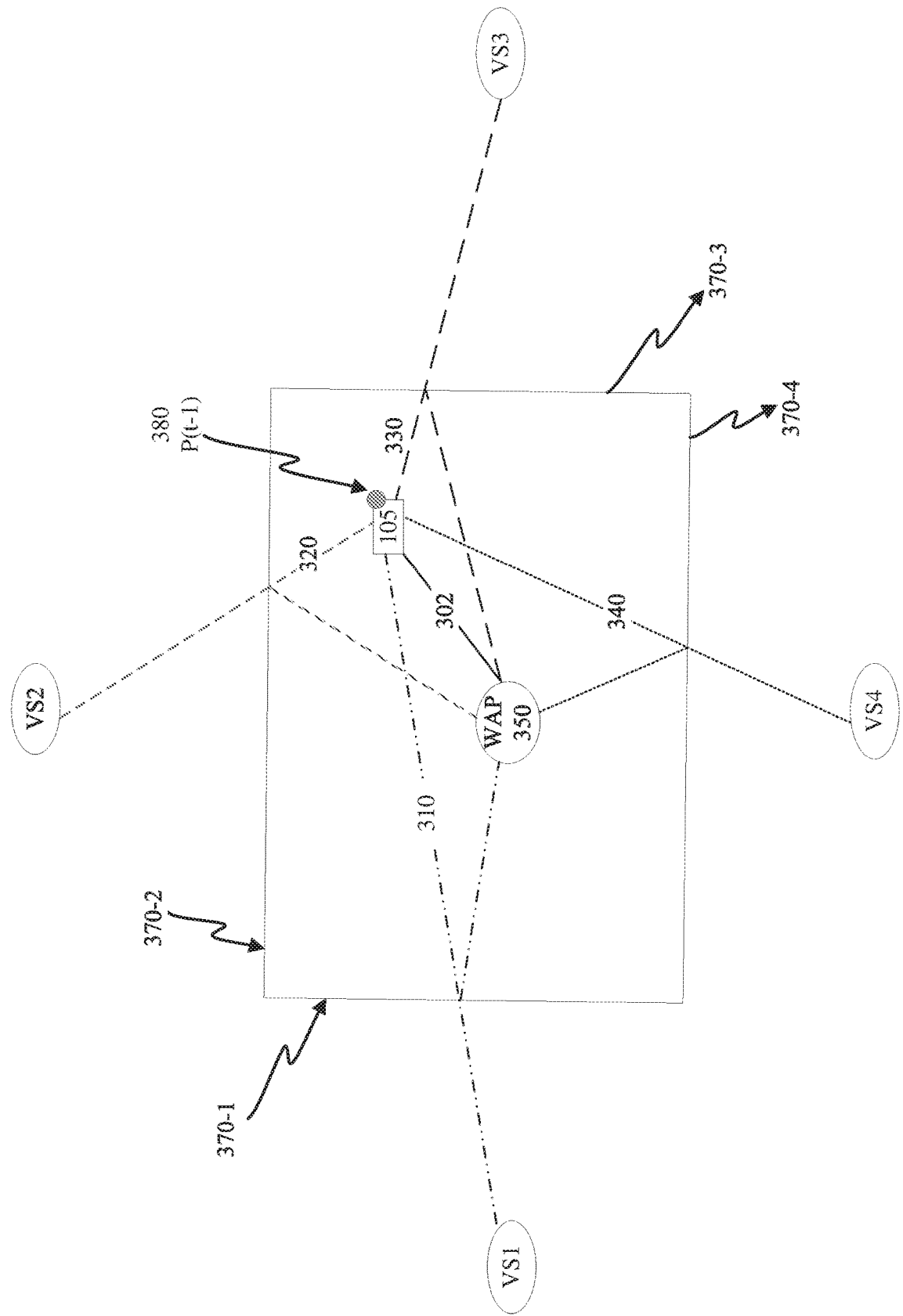
FIGS. 3A-3B illustrate an example scenario to illustrate the operation of method of FIG. 2, showing an environment with reflecting surfaces where a single WAP transmits signals to a UE.
Figure 3B:
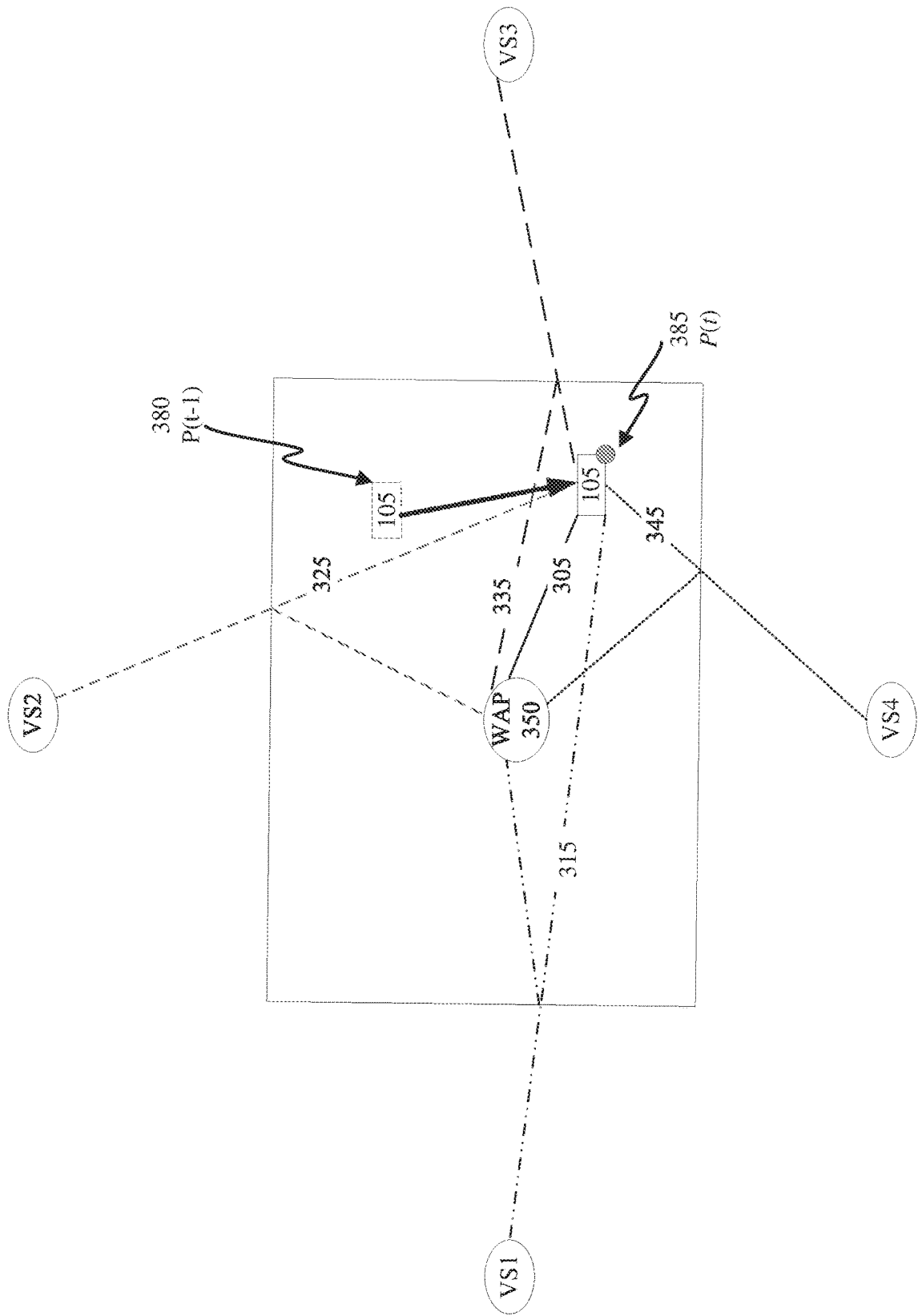

FIGS. 3A and 3B illustrate an example scenario showing an environment with reflecting surfaces 370 where a single WAP 350 transmits signals to UE 105 to illustrate the operation of method 200. As shown in FIG. 3A, at time (t−1), UE 105 may be determined to be at a first position given by P(t−1) 380. At first position P(t−1) 380, the communication channel between UE 105 and WAP 350 may include LOS signal 302, as well as, NLOS signal 310 (reflected off surface 370-1), NLOS signal 320 (reflected off surface 370-2), NLOS signal 330 (reflected off surface 370-3), and NLOS signal 340 (reflected off surface 370-4). WAP almanac information 208 (not shown in FIG. 3A) may include information about reflection points (e.g. surfaces 370-1, 370-2, 370-3, and 370-4) associated with first position P(t−1) 380 of UE 105. FIG. 3A shows virtual sources VS1, VS2, VS3, and VS4. Virtual sources VS1, VS2, VS3, and VS4 may be associated with first position 380 in WAP almanac information 208.

Referring to FIG. 3B, at time t, UE 105 may move to second position P(t) 385. As a consequence of the movement of UE 105 from P(t−1) 380 to P(t) 385, the paths of the LOS and NLOS signals in a communication channel between UE 105 and WAP 350 at position P(t) 385 have changed relative to corresponding signals at position P(t−1) 380. As shown in FIG. 3B, at P(t) 385, the communication channel between UE 105 and WAP 350 now includes LOS signal 305, NLOS signal 315 (reflected off surface 370-1), NLOS signal 325 (reflected off surface 370-2), NLOS signal 335 (reflected off surface 370-3), and NLOS signal 345 (reflected off surface 370-4). LOS signal 305 and NLOS signals 315, 325, 335, and 345 (when UE is at position P(t) 385) follow different paths relative to corresponding signals 302, 310, 320, 330, and 340, (when UE was at position P(t−1) 380), respectively.

When at second position P(t) 385, UE 105 may obtain channel measurements (e.g. in block 205 in FIG. 2A) related to the communication channel with WAP 350. The channel measurements may include, for example, channel impulse response (CIR) and other measurements.

Channel parameters (e.g. AOA, AOD, phase vectors corresponding to the LOS and NLOS components) may be determined (e.g. in block 210 in FIG. 2A) based on the channel measurements (e.g. by UE 105) at second position P(t) 385. Further (e.g. in blocks 212 and 214 in FIG. 2C), based on the first position P(t−1) 380 of UE 105, WAP almanac information may be queried to provide, a plurality of virtual sources such as virtual sources VS1, VS2, VS3, and VS4 that are likely to be visible at first position P(t−1) 380, as well as corresponding information about the plurality of virtual sources such as a corresponding identifiers, corresponding locations, etc. For example, a pose (e.g. location and orientation) of UE 105 with respect to each signal source (e.g. WAP 350, VS1, VS2, VS3, and VS4) may also be determined (e.g. in block 210, for example, by UE 105.

Based on the corresponding determined channel parameters (e.g. AOA, AOD, phase vectors, etc.) and the relative position of UE with respect to each signal source, channel parameters may be associated with each of the plurality of signal sources (e.g. in block 220, for example, by UE 105).

The second position P(t) 385 of UE 105 may then be estimated (e.g. in block 225) based on the first position P(t−1) 380 of UE 105 and the association of the plurality of signal sources with corresponding channel parameters. For example, the first position P(t−1) 380 of UE 105, and the association of the plurality of signal sources with corresponding channel parameters (e.g. mapping of channel parameters to corresponding signal sources 250 in FIG. 2D) may be input to a Bayesian filter, which may output second position P(t) 385 of UE 105. In some embodiments, at time t, the Bayesian filter may jointly estimate the second position P(t) 385 of UE 105, the corresponding positions of signal sources, corresponding signal blockage probabilities, and (if applicable) corresponding antenna geometries.

Figure 4:
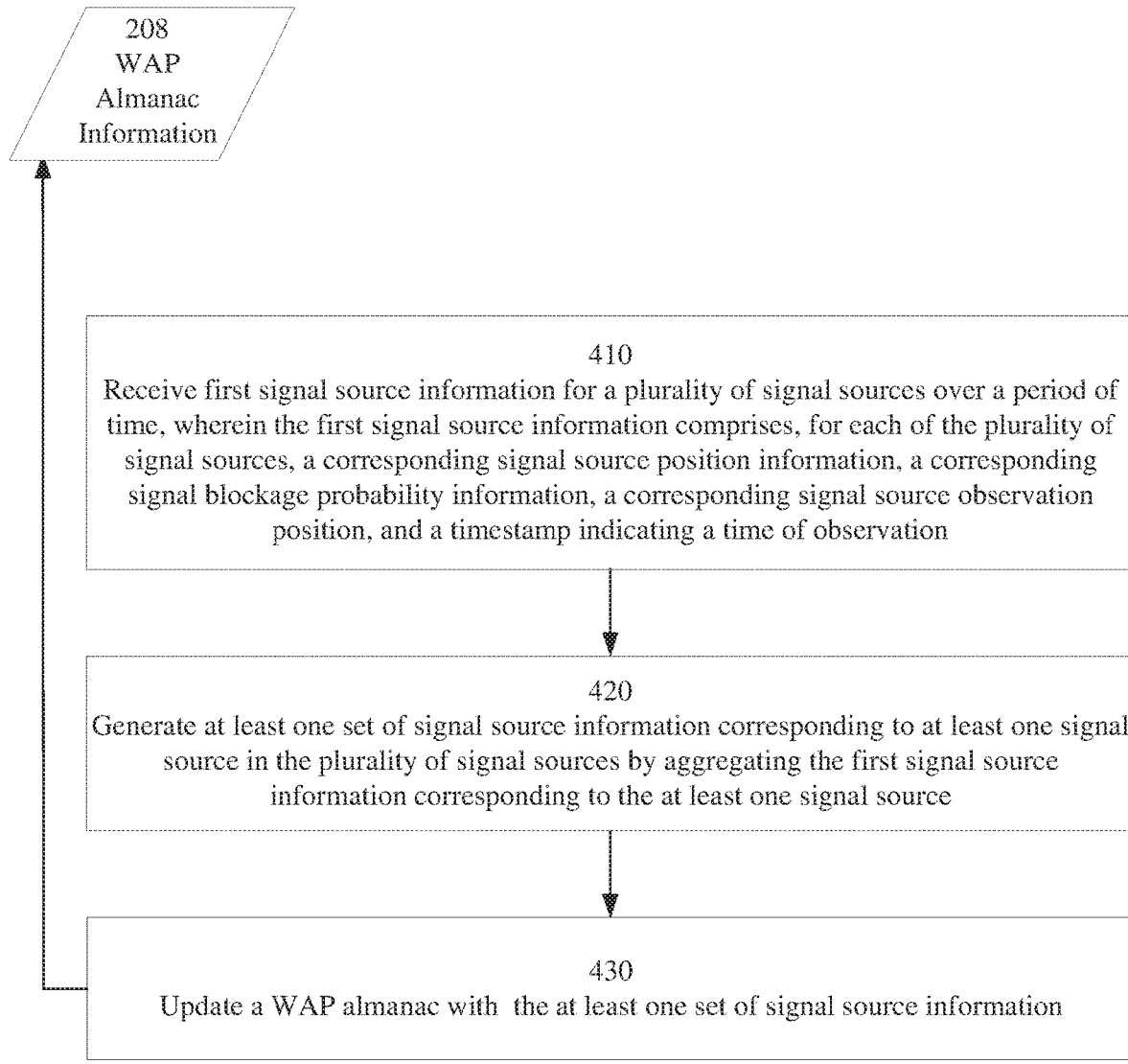
FIG. 4 shows a flowchart of a method to facilitate UE position determination.

FIG. 4 shows a flowchart of an exemplary method 400 to support position determination according to some disclosed embodiments. In some embodiments, method 400 may be used to update WAP almanac information 208 (e.g. pertaining to a plurality of WAPs/signal sources). In some embodiments, method 400 may be performed by one or more of (a) UE 105 (e.g. when WAP almanac information 208 is local to and maintained by the UE), or (b) a location server (e.g. LMF 120 and/or server 180), or (c) another network entity, or (d) a combination thereof. In some embodiments, the location server may form part of a 5G Core Network (5GCN) and may comprise a Location Management Function (LMF).

In block 410, first signal source information for a plurality of signal sources may be received over a period of time, wherein the first signal source information may comprise, for each of the plurality of signal sources, a corresponding signal source position information, a corresponding signal blockage probability information, a corresponding signal source observation position, and a timestamp indicating a time of observation. The first signal source information may be obtained from a plurality of mobile devices, for example, through crowdsourcing.

In some embodiments, an RF survey (e.g. RF survey 206) of area, known antenna geometry for signal sources in the area and/or visible from the area, and area geometry (e.g. area geometry 203, which may comprise information about environmental features for the area) may be used to obtain and initialize a portion of the initial WAP almanac information 208.

For a signal source, the corresponding first signal source information may comprise a plurality of measurements, information, and/or observations related to the signal source. For example, the corresponding first signal source information for a signal source may comprise observation locations where the signal source was observed, estimated locations of the signal source, signal blockage probabilities, signal source antenna geometry, etc. that were obtained over the period of time (in block 410).

In block 420, at least one set of signal source information corresponding to at least one signal source in the plurality of signal sources may be generated by aggregating the first signal source information corresponding to the at least one signal source. In some embodiments, the aggregation of the first signal source information corresponding to the at least one signal source may be based on observation positions of the at least one signal source.

The first signal source information corresponding to the at least one signal source may be combined mathematically and/or statistically to obtain the at least one set of signal source information corresponding to at least one signal source. In some embodiments, the at least one set of signal source information corresponding to at least one signal source may be used to update the WAP almanac information 208.

In block 430, the WAP almanac information 208 may be updated with the at least one set of signal source information. For example, WAP almanac information 208 may facilitate determination of signal sources (information related to those signal sources) from position information. In some embodiments, the updated WAP almanac information may be provided (e.g. by LMF 120 and/or server 180) to one or more user equipments (UEs) as location assistance information.

In one implementation, a first user equipment (UE) position information may be received, wherein the first UE position information comprises a probability density function of UE position, and a set of visible signal sources may be determined including virtual signal sources based on: the first UE position information and the updated WAP almanac information. For example, the first UE position information may be received as part of a location assistance request from a user equipment (UE), and in response to the location assistance request, location assistance information to the UE may be provided, wherein the location assistance information comprises the set of visible signal sources.

Figure 5:
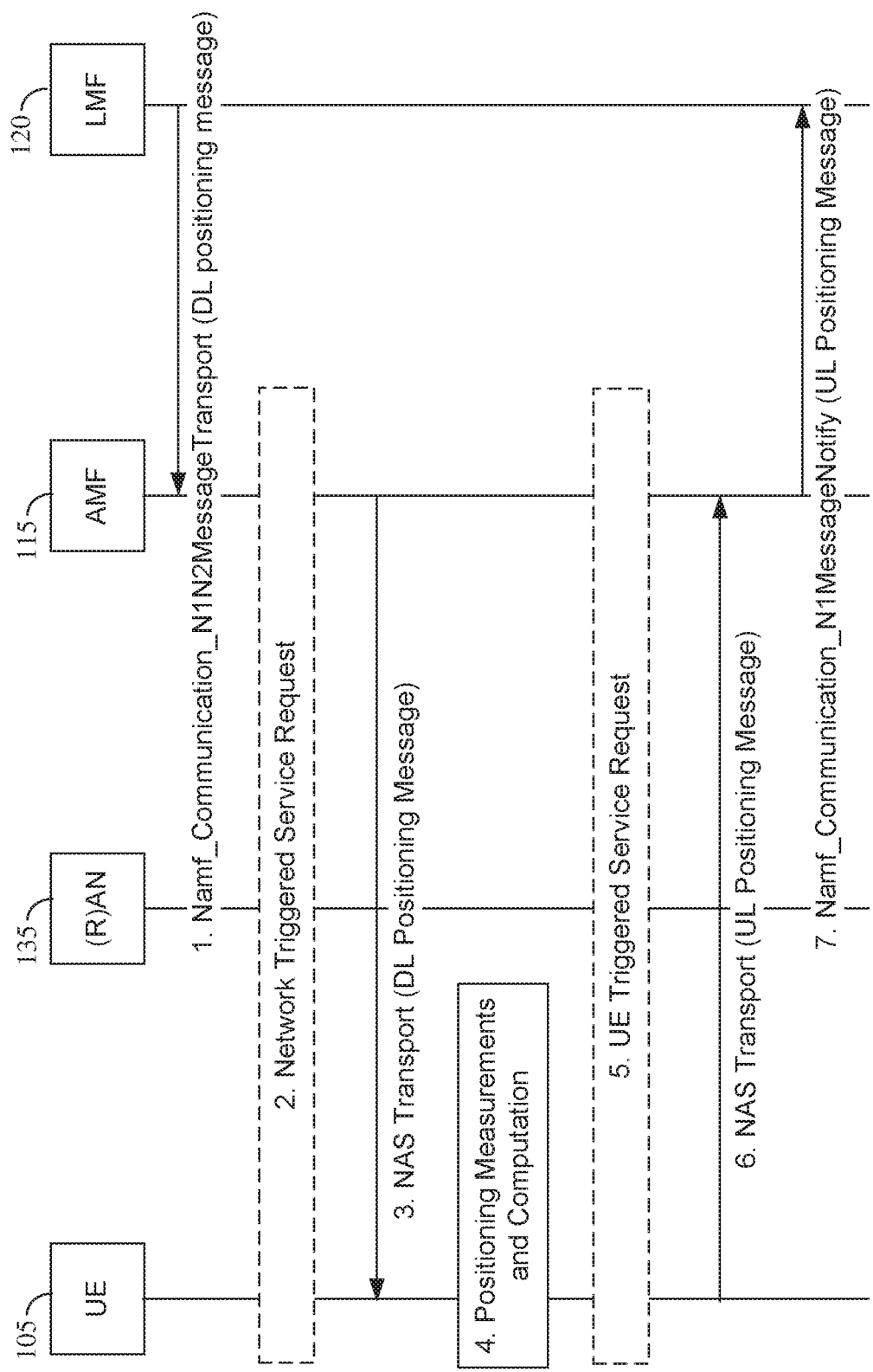
FIG. 5 shows a UE assisted/UE based positioning procedure, which may be used by an LMF to support UE based positioning, UE assisted positioning and delivery of assistance data.

FIG. 5 shows a positioning procedure, referred to here as a UE assisted and UE based positioning procedure, used by an LMF 120 to support UE based positioning, UE assisted positioning and delivery of assistance data. The procedure is based on use of the LPP protocol, defined in 3GPP TS 36.355, "LTE Positioning Protocol (LPP)", between the LMF 120 and UE 105, though could instead be NPP or LPP combined with NPP. A precondition for the procedure can be that a UE 105 identifier and an AMF 115 identity have been passed to the LMF 120 by the serving AMF 115. The UE identifier may be a SUPI or a 5G Temporary Mobile Subscription Identifier (5G-TMSI). The UE identifier and AMF 115 identity may be passed when the AMF 115 informs the LMF 120 of a location request, or when the AMF 115 transfers a location event report to the LMF 120. It is noted that the terms identity, identifier, and address can be the same and are used interchangeably herein.

At stage 1 in FIG. 5, the LMF 120 invokes the Namf_Communication_N1N2MessageTransport service operation towards the AMF 115 to request the transfer of a Downlink (DL) Positioning message (e.g. LPP message) to the UE 105. The service operation includes the DL Positioning message and the UE 105 identifier. The Downlink Positioning message may request location information from the UE 105, provide assistance data to the UE 105 or query for the UE 105 capabilities.

At stage 2, if the UE 105 is in a CM IDLE state, the AMF 115 initiates a network triggered Service Request procedure as defined in 3GPP TS 23.502 to establish a signaling connection with the UE 105.

At stage 3, the AMF 115 forwards the Downlink Positioning message to the UE 105 in a NAS Transport message. The AMF 115 includes a Routing identifier, in the NAS transport message, identifying the LMF 120 (e.g. a global address of the LMF 120 such as an IP address).

At stage 4, the UE 105 stores any assistance data (e.g. WAP almanac information 208) provided in the Downlink Positioning message and performs any positioning measurements and location computation requested by the Downlink Positioning message.

At stage 5, if the UE 105 is in CM-IDLE state, the UE 105 instigates the UE triggered Service Request as defined in 3GPP TS 23.502 in order to establish a signaling connection with the AMF 115.

At stage 6, the UE 105 returns any location information obtained in stage 4 or returns any capabilities requested in stage 3 to the AMF 115 in an Uplink Positioning message (e.g. an LPP message) included in a NAS Transport message. The Uplink Positioning message may alternatively carry a request for further assistance data. The UE 105 also includes the Routing identifier in the NAS Transport message received in stage 3.

At stage 7, the AMF 115 invokes the Namf_Communication_N1MessageNotify service operation towards the LMF indicated by the routing identifier received in stage 6 (which in this example is LMF 120). The service operation includes the Uplink Positioning message received in stage 6 and the UE 105 identifier. Stages 6 and 7 may be repeated if the UE 105 needs to send multiple messages to respond to the request received in Stage 3.

Stages 1 to 7 may be repeated to send new assistance data, and to request further location information and further UE capabilities.

Figure 6:
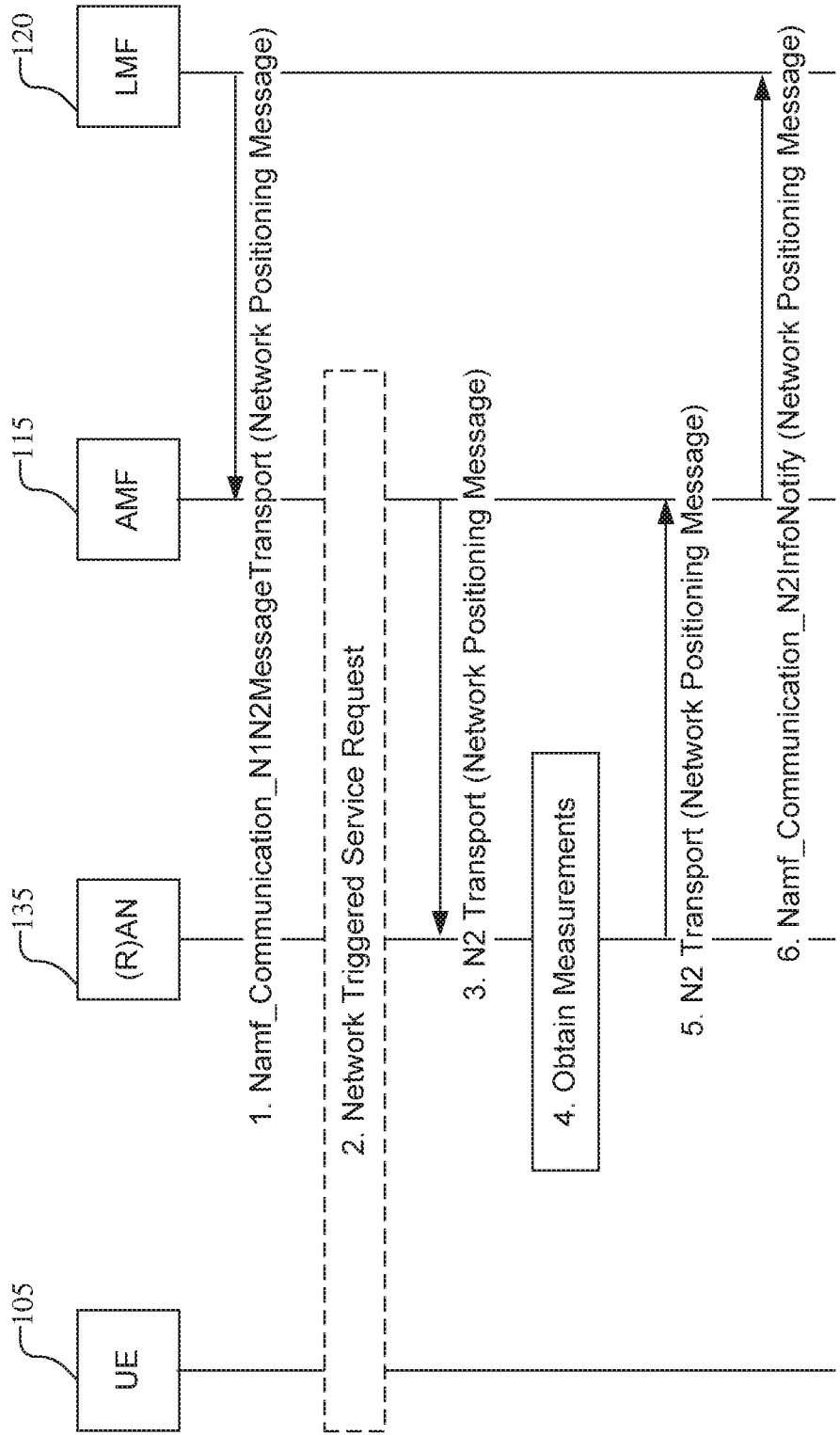
FIG. 6 shows a network assisted positioning procedure that may be used by an LMF to support network assisted and network based positioning.

FIG. 6 shows a procedure, referred to here as a network assisted positioning procedure, that may be used by an LMF 120 to support network assisted and network based positioning. The procedure may be based on an NRPPa protocol defined in 3GPP TS 38.455, "NR Positioning Protocol A (NRPPa)" between the LMF 120 and (R)AN 135. A precondition for the procedure can be that a UE 105 identifier and an AMF 115 identity have been passed to the LMF 120 by the serving AMF 115. The UE 105 identifier may be a SUPI or a 5G-TMSI. The UE 105 identifier and AMF 115 identity may be passed when the AMF 115 informs the LMF 120 of a location request, or when the AMF 115 transfers a location event report to the LMF 120.

At stage 1 in FIG. 6, the LMF 120 invokes the Namf_Communication_N1N2MessageTransport service operation towards the AMF 115 to request the transfer of a Network Positioning message (e.g. an NRPPa message) to the serving base station (e.g. gNB 110 or ng-eNB 114) for the UE 105. The service operation includes the Network Positioning message and the UE 105 identifier. The Network Positioning message may request location information for the UE 105 from the (R)AN 135.

At stage 2, if the UE 105 is in CM IDLE state, the AMF 115 initiates a network triggered Service Request procedure as defined in 3GPP TS 23.502, to establish a signaling connection with the UE 105.

At stage 3, the AMF 115 forwards the Network Positioning message to the serving base station in an N2 Transport message. The AMF 115 includes a Routing identifier, in the N2 Transport message, identifying the LMF 120 (e.g. a global address of the LMF 120).

At stage 4, the serving base station obtains any location information for the UE 105 requested in stage 3.

At stage 5, the serving base station returns any location information obtained in stage 4 to the AMF 115 in a Network Positioning message included in an N2 Transport message. The serving base station also includes the Routing identifier in the N2 Transport message received in stage 3.

At stage 6, the AMF 115 invokes the Namf_Communication_N2InfoNotify service operation towards the LMF 120 indicated by the routing identifier received in stage 5. The service operation includes the Network Positioning message received in stage 5 and the UE 105 identifier. Stages 1 to 6 may be repeated to request further location information and further (R)AN capabilities.

Figure 7:
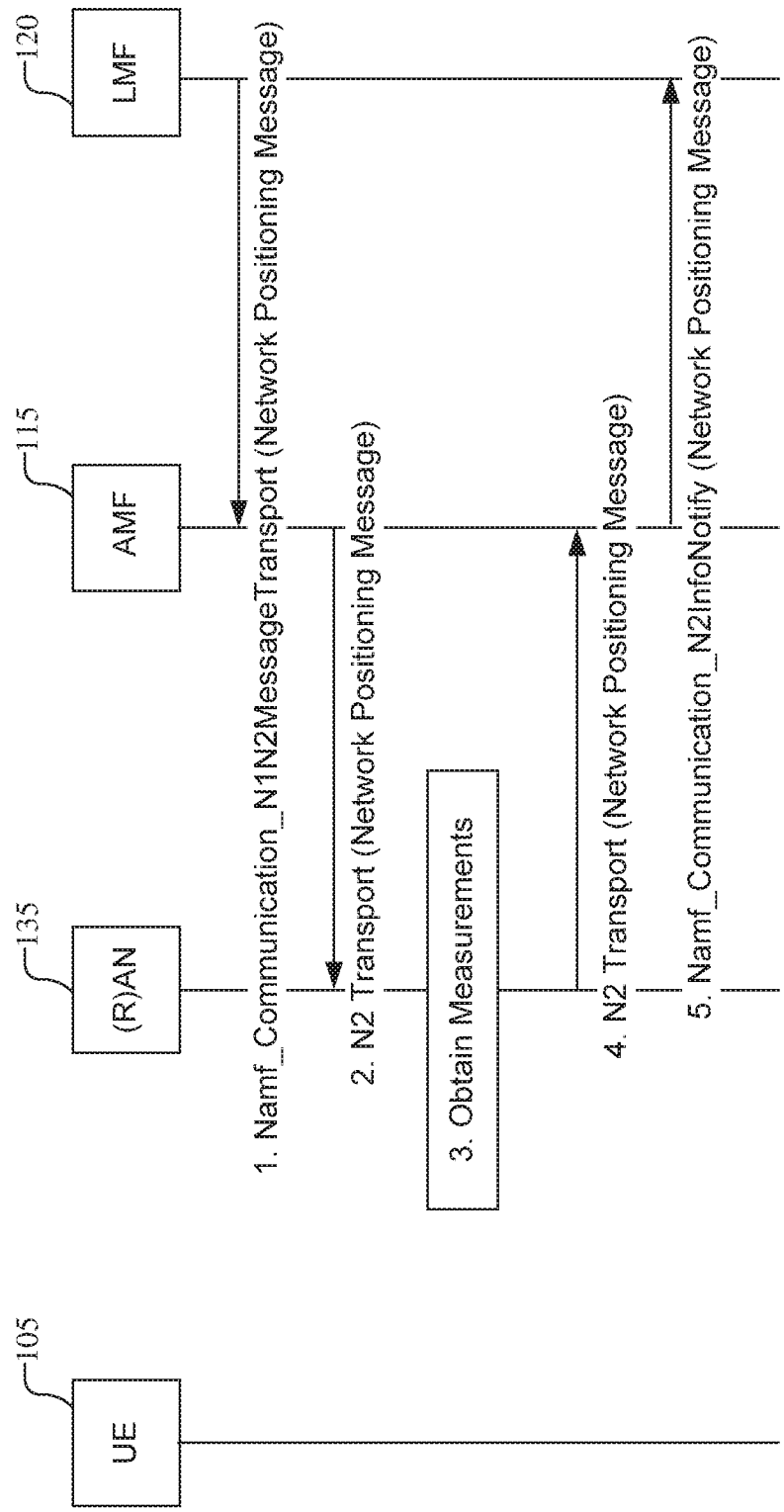
FIG. 7 shows a procedure for obtaining non-UE associated network assistance data, which may be used by an LMF to support positioning of one or more UEs.

FIG. 7 shows a procedure for obtaining non-UE associated network assistance data, which may be used by an LMF 120 to support positioning of one or more UEs such as UE 105. This procedure may not be associated with a UE 105 location session. It may be used to obtain network assistance data from a base station (e.g. gNB 110 or ng-eNB 114). The procedure may be based on an NRPPa protocol defined in 3GPP TS 38.455, "NR Positioning Protocol A (NRPPa)" between the LMF 120 and (R)AN 135.

At stage 1 in FIG. 7, the LMF 120 invokes the Namf_Communication_N1N2MessageTransport service operation towards the AMF 115 to request the transfer of a Network Positioning message (e.g. an NRPPa message) to a base station (e.g. gNB 110 or ng-eNB 114) in the (R)AN 135. The service operation includes the Network Positioning message and the target base station identity. The Network Positioning message may request position related information from the (R)AN.

At stage 2, the AMF 115 forwards the Network Positioning message to the target base station indicated in stage 1 in an N2 Transport message. The AMF 115 includes a Routing identifier, in the N2 Transport message, identifying the LMF 120 (e.g. a global address of the LMF 120).

At stage 3, the target base station obtains any position related information requested in stage 2.

At stage 4, the target base station returns any position related information obtained in stage 3 to the AMF 115 in a Network Positioning message included in an N2 Transport message. The target base station also includes the Routing identifier in the N2 Transport message received in stage 2.

At stage 5, the AMF 115 invokes the Namf_Communication_N2InfoNotify service operation towards the LMF 120 indicated by the routing identifier received in stage 4. The service operation includes the Network Positioning message received in stage 4 and possibly the target base station identity. Stages 1 to 5 may be repeated to request further position related information from the (R)AN 135.

Figure 8:
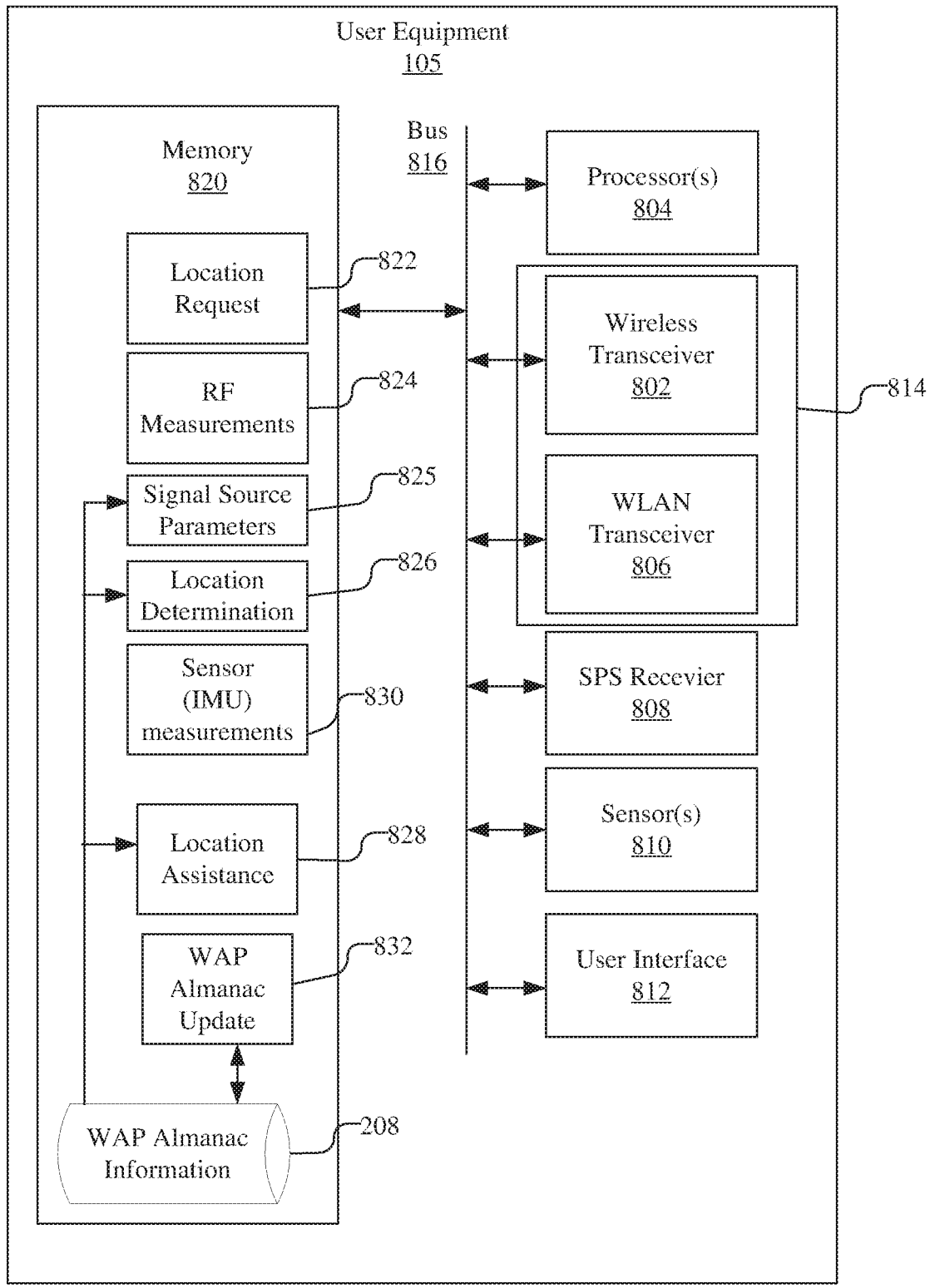
FIG. 8 is a diagram illustrating a hardware implementation of a UE.

FIG. 8 is a diagram illustrating an example of a hardware implementation of UE 105 shown in FIG. 1A. UE 105 may include one or more processors 804. The one or more processors 804 may be implemented using a combination of hardware, firmware, and/or software. For a hardware implementation, the one or more processors 804 may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units.

The UE 105 may include an external interface, i.e., transceiver 814, which may include wireless transceiver 802 to wirelessly communicate with an NG-RAN 135, e.g., base stations such as gNB 110 or ng-eNB 114 (shown in FIG. 1A). Transceiver 814 may also include additional transceivers, such a wireless local area network (WLAN) transceiver 806. The term transceiver, as used herein, refers to any of the above types of transceivers. Transceiver 814 (e.g. one or more of Wireless transceiver 802 and/or WLAN transceiver 806) may obtain RF measurements including channel measurements and, in some instances, may send RF and other UE measurements to a network entity (e.g. network entity 900, which may serve as LMF 120 and/or server 180). UE 105 may further include SPS receiver 808 for receiving and measuring signals from SPS SVs 190 (shown in FIG. 1A), which may be used by processors 804 to determine UE position information.

The UE 105 may further include one or more sensors 810, such as an Inertial Measurement Unit (IMU). IMU may comprise 3 axis accelerometer(s), 3-axis gyroscope(s), electronic compass, and/or magnetometer(s), may provide velocity, orientation, and/or other position related information to processors 804. In some embodiments, the output of IMU may be used by processors to determine a position and orientation of UE 105. Sensors 810 may further include cameras, barometers, etc.

UE 105 may further include a user interface 812 that may include e.g., a display, a keypad or other input device, such as virtual keypad on the display, through which a user may interface with the UE 105. The UE 105 further includes one or more processors 804 and memory 820, which may be coupled together with bus 816. The one or more processors 804 and other components of the UE 105 may similarly be coupled together with bus 816, a separate bus, or may be directly connected together or coupled using a combination of the foregoing. Memory 820 may contain executable code or software instructions that when executed by the one or more processors 804 cause the one or more processors to operate as a special purpose computer programmed to perform some or all the methods and flows disclosed herein (e.g. in FIGS. 2-5).

As illustrated in FIG. 8, memory 820 includes software that when implemented by the one or more processors 804 implement the methodologies as described herein. FIG. 8 shows functionality implemented using software in memory 820 that is executable by the one or more processors 804. However, it should be understood that components or modules such as dedicated hardware either in the processor or off processor, firmware, etc. may be used to implement similar functionality. Memory 820 may be implemented within the processors 804 and/or external to the processors 804. As used herein the term "memory" refers to any type of long term, short term, volatile, nonvolatile, or other memory and is not to be limited to any particular type of memory or number of memories, or type of media upon which memory is stored.

As illustrated, memory 820 may include a location request unit 822 that enables the one or more processors 804 to receive (e.g. via the wireless transceiver 802 and/or WLAN transceiver 806) and process a request (e.g. periodic or triggered) for location information of the UE from a first location server (e.g., LMF 120 or server 180) in the wireless network. In some instances, the first location server may have received the request for the periodic or triggered location for the UE from a first Core Network (CN) node, e.g., AMF 115. Further, the first CN node may have received the request for the periodic or triggered location for the UE from another entity, e.g., GMLC 125.

Memory 820 may include RF measurements unit 824 that enables the one or more processors 804 to obtain and process RF measurements including channel measurements from signals received by wireless transceiver 802 and/or WLAN transceiver 806.

Memory 820 may include a signal source parameters unit 825 that enables the one or more processors 804 to determine channel parameters related to signal sources from which RF measurements are made, e.g., based on WAP almanac information and channel measurements, wherein the channel parameters are indicative of positions of a plurality of signal sources relative to a first position information of a User Equipment (UE). In some embodiments, the signal source parameters unit 825 may enable the one or more processors 804 to associate signal sources with corresponding channel parameters. The signal source parameters unit 825 may further enable the one or more processors 804 to determine position information of at least one signal source, which may be, e.g., probability density function of the position of the signal source. The signal source parameters unit 825 may further enable the one or more processors 804 to determine a signal blockage probability corresponding to one or more signal sources. The signal source parameters unit 825 may further enable the one or more processors 804 to determine an antenna geometry for a signal source, e.g., where the signal source is a multi-antenna system or supports Multiple In Multiple Out (MIMO) communication. The signal source parameters unit 825 may further enable the one or more processors 804 to generate a set of signal source information for a signal source by aggregating signal source information corresponding to the signal source. The signal source parameters unit 825 may further enable the one or more processors 804 to determine a set of visible signal sources including virtual signal sources based on UE position information and the updated WAP almanac information.

Memory 820 may include sensor measurement processing unit 830 that enables the one or more processors 804 to process IMU and/or other sensor measurements obtained by sensors 810. For example, sensor measurement processing unit 830 may facilitate location determination (e.g. by location determination unit 826) by determining and providing velocity (speed and direction of travel) and/or rotational parameters from IMU measurements.

Memory 820 may include a location determination unit 826 that causes the one or more processors 804 to determine a location for the UE based on various input parameters. In some embodiments, location determination unit 826 may include Bayesian filter (e.g. Bayesian filter 245 in FIG. 2D) and may include functionality to perform one or more functions or flows described in FIGS. 2-7. In some embodiments, location determination unit 826 may include motion models (e.g. UE motion model 254 for UE 105) and/or a UE temporal signal blockage model (UE temporal signal blockage model 255, which may be based on UE motion). In some embodiments, location determination unit 826 may query WAP almanac information 208 for signal source information based on an estimated location of UE 105. In some embodiments, location determination unit 826 may determine a position of UE 105 using measurements from SPS receiver, RF measurements, sensor measurements, or any combination thereof.

Memory 820 may include a location assistance unit 828 that enables the one or more processors 804 to obtain, process, and/or store location assistance data from a location server (e.g. network entity 900, which may serve as LMF 120 and/or server 180). For example, the location assistance data may comprise WAP almanac information 208. Information processed by location assistance unit 828 may be used to determine UE position information (e.g. by location determination unit 826).

Memory 820 may include a WAP almanac update unit 832 that enables the one or more processors 804 to periodically update WAP almanac information 208. In some embodiments, WAP almanac update unit 832 may include functionality to perform some or all of the functions describe in FIG. 4. The updates may be based on information obtained by UE 105 (e.g. from a combination of RF measurements by UE 105 over time, RF surveys, area geometry information, etc.) and/or based on information received from a location server (e.g. LMF 120 and/or server 180) and/or another network entity. For example, the WAP almanac information for a signal source may be updated with position information for the signal source, corresponding signal blockage probability, and corresponding antenna geometry. For example, the location server (e.g. LMF 120 and/or server 180) and/or another network entity may aggregate information pertaining to signal sources over a period of time, associate the signal source information with locations on a map, and update WAP almanac information 208. The updated WAP almanac information 208 may be provided to UEs 105 and updated using functionality provided by WAP almanac update unit 832.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software code may be stored in a memory and executed by one or more processor units, causing the processor units to operate as a special purpose computer programmed to perform all or a portion of the methods or flows disclosed herein (e.g. in FIGS. 2-5).

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Separately, in addition to storage on computer-readable storage medium, instructions and/or data may be provided as signals on transmission media included in a communication apparatus. For example, a communication apparatus may include a transceiver having signals indicative of instructions and data. The instructions and data can be stored on computer readable media, e.g., memory 910. When the stored instructions and data are read and executed by processor 904, the instructions and data and may configure the one or more processors to operate as a special purpose computer programmed to perform the methods and flows disclosed herein (e.g. in FIGS. 2-5). Thus, a communication apparatus may include transmission media with signals indicative of information to perform disclosed functions as outlined above. At a first time, the transmission media included in the communication apparatus may include a first portion of the information to perform the disclosed functions, while at a second time the transmission media included in the communication apparatus may include a second portion of the information to perform the disclosed functions.

The methodologies described herein may be implemented by various means depending upon the application. For example, these methodologies may be implemented in hardware, firmware, software, or any combination thereof. For a hardware implementation, the one or more processors 804 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In one implementation, an entity in a wireless network, such as UE 105, may be configured to support position determination and may include a means for obtaining a plurality of channel measurements for at least one Wireless Access Point (WAP), wherein a channel comprises Line of Sight (LOS) and Non-LOS (NLOS) signals, which may be, e.g., the transceiver 814 and one or more processors 804 with dedicated hardware or implementing executable code or software instructions in memory 820, such as the RF measurement unit 824. A means for determining, based on WAP almanac information and the plurality of channel measurements for the at least one WAP, at least one corresponding set of channel parameters, wherein the channel parameters are indicative of positions of a plurality of signal sources relative to a first position information of a User Equipment (UE) may be, e.g., the one or more processors 804 with dedicated hardware or implementing executable code or software instructions in memory 820, such as the signal source parameters 825. A means for associating the plurality of signal sources with corresponding channel parameters in the at least one set of channel parameters may be, e.g., the one or more processors 804 with dedicated hardware or implementing executable code or software instructions in memory 820, such as the signal source parameters unit 825. A means for determining, based on the first position information of the UE and the association of the plurality of signal sources with corresponding channel parameters, a second position information of the UE may be, e.g., the one or more processors 804 with dedicated hardware or implementing executable code or software instructions in memory 820, such as the location determination unit 826.

The entity may further include a means for determining a position information of at least one signal source in the plurality of signal sources, which may be, e.g., the one or more processors 804 with dedicated hardware or implementing executable code or software instructions in memory 820, such as the signal source parameters unit 825. The entity may further include a means for determining, for the at least one signal source, a corresponding signal blockage probability, which may be, e.g., the one or more processors 804 with dedicated hardware or implementing executable code or software instructions in memory 820, such as the signal source parameters unit 825. The entity may further include a means for determining an antenna geometry for the at least one signal source, wherein the at least one signal source comprises a multi-antenna system or supports Multiple In Multiple Out (MIMO) communication, which may be, e.g., the one or more processors 804 with dedicated hardware or implementing executable code or software instructions in memory 820, such as the signal source parameters unit 825. The entity may further include a means for updating the WAP almanac information with the position information of the at least one signal source and the corresponding signal blockage probability of the at least one signal source and the antenna geometry for the at least one signal source which may be, e.g., the one or more processors 804 with dedicated hardware or implementing executable code or software instructions in memory 820, such as the WAP almanac update unit 832.

The means for determining the second position information of the UE, which may be, e.g., the one or more processors 804 with dedicated hardware or implementing executable code or software instructions in memory 820, such as the location determination unit 826 may provide the first position information of the UE and the association of the plurality of signal sources with corresponding channel parameters to a Bayesian filter, wherein the Bayesian filter determines the second position information of the UE.

In one implementation, an entity in a wireless network, such as UE 105, may be configured to support position determination and may include a means for receiving a first signal source information for a plurality of signal sources over a period of time, wherein the first signal source information comprises, for each of the plurality of signal sources, a corresponding signal source position information, a corresponding signal blockage probability information, a corresponding signal source observation position, and a timestamp indicating a time of observation, which may be, e.g., the transceiver 814 and one or more processors 804 with dedicated hardware or implementing executable code or software instructions in memory 820, such as the location assistance unit 828 and RF measurements unit 824, signal source parameters unit 825, and location determination unit 826. A means for generating at least one set of signal source information corresponding to at least one signal source in the plurality of signal sources by aggregating the first signal source information corresponding to the at least one signal source may be, e.g., the one or more processors 804 with dedicated hardware or implementing executable code or software instructions in memory 820, such as the signal source parameters unit 825. A means for updating Wireless Access Point (WAP) almanac information with the at least one set of signal source information may be, e.g., the one or more processors 804 with dedicated hardware or implementing executable code or software instructions in memory 820, such as the WAP almanac update unit 832.

The entity may further include a means for receiving a first user equipment (UE) position information, wherein the first UE position information comprises a probability density function of UE position, which may be, e.g., the transceiver 814 and one or more processors 804 with dedicated hardware or implementing executable code or software instructions in memory 820, such as the location assistance unit 828. A means for determining a set of visible signal sources including virtual signal sources based on: the first UE position information and the updated WAP almanac information may be, e.g., the one or more processors 804 with dedicated hardware or implementing executable code or software instructions in memory 820, such as the signal source parameters unit 825.

Figure 9:
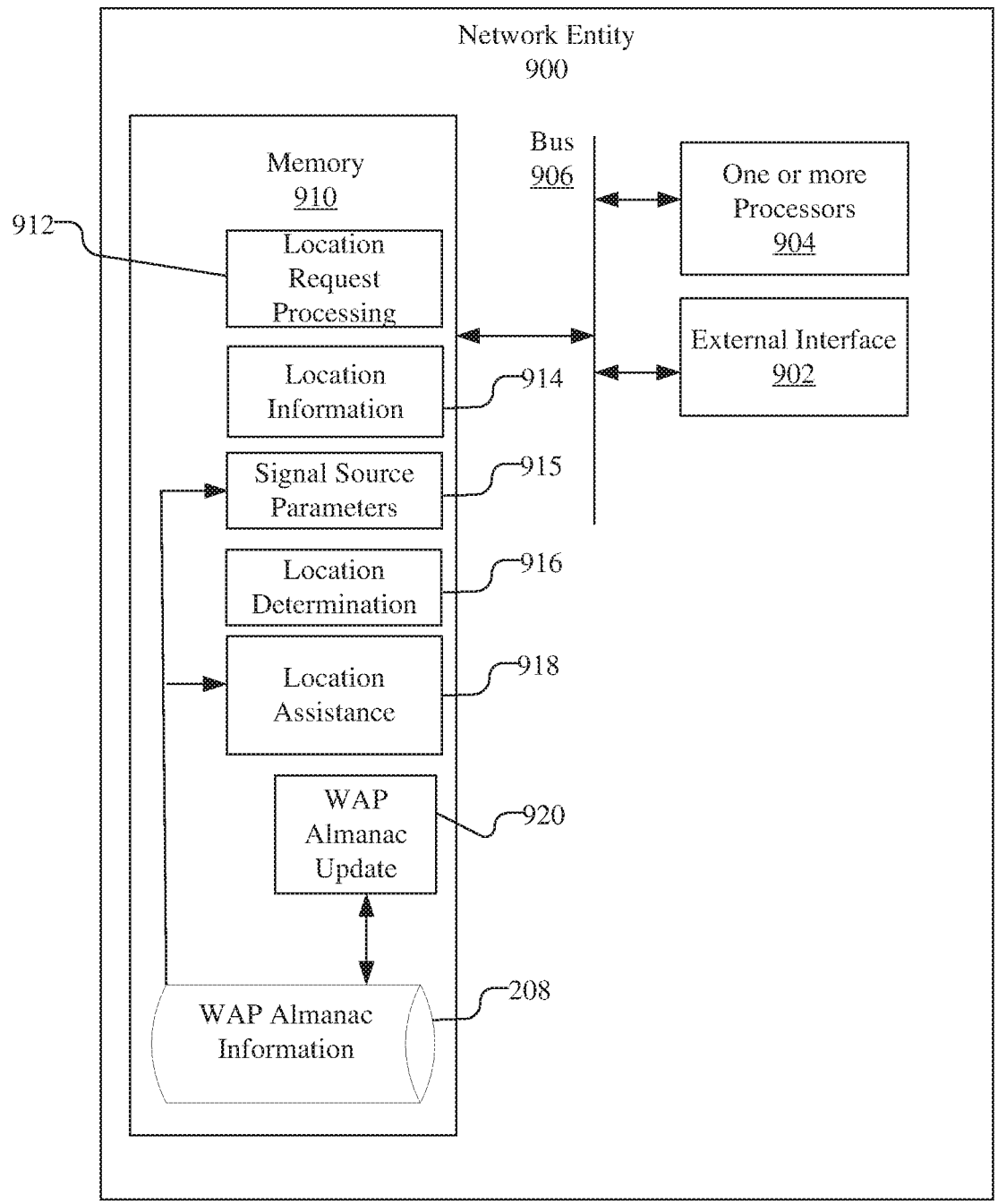
FIG. 9 is a diagram illustrating a hardware implementation of a network entity to support position determination.

FIG. 9 is a diagram illustrating an example of a hardware implementation of a network entity 900 to support position determination. In some embodiments, network entity 900 may be a location server (such as LMF 120 or server 180). Network entity 900 may be, e.g., part of a wireless network such as a 5G Core network (5GCN). Network entity may perform all of part of the methods and flows described in FIGS. 2-7.

In some embodiments, network entity 900 may include one or more processors 904. The one or more processors 904 may be implemented using a combination of hardware, firmware, and/or software. For a hardware implementation, the one or more processors 804 may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units.

In some embodiments, network entity 900 may include e.g., hardware components such as an external interface 902, which may be a wired or wireless interface capable of connecting to UEs 105, one or more servers, a GMLC, such as GMLC 125 and AMF 115. In some embodiments, network entity 900 may include one or more processors 904 and memory 910, which may be coupled together with bus 906. The memory 910 may contain executable code or software instructions that when executed by the one or more processors 904 cause the one or more processors to operate as a special purpose computer programmed to perform all or a portion of the methods and flows disclosed herein, such as the methods and flows outlined in FIGS. 2-7.

As illustrated in FIG. 9, memory 910 includes software that when implemented by the one or more processors 904 implement the methodologies as described herein. FIG. 9 shows functionality implemented using software in memory 910 that is executable by the one or more processors 904. However, it should be understood that components or modules such as dedicated hardware either in the processor or off processor, firmware, etc. may be used to implement similar functionality. Memory 910 may be implemented within the processor unit or external to the processor unit. As used herein, the term "memory" refers to any type of long term, short term, volatile, nonvolatile, or other memory and is not to be limited to any particular type of memory or number of memories, or type of media upon which memory is stored.

As illustrated, the memory 910 may include location request processing unit 912 that causes the one or more processors 904 to receive location requests via the external interface 902 and process the location service requests. In some embodiments, a location service request may comprise requests for location assistance. When functioning as LMF 120, location request processing unit 912 may cause one or more processors 904 to process the location service requests such as a Mobile Terminated Location Request (MR-LR), a Mobile Originated Location Request (MO-LR) or a Network Induced Location Request (NI-LR) for UE 105. Further, processors 904 may use control plane interfaces and control plane protocols to receive the location service request and to communicate with at least one other entity.

Memory 910 may include a location information unit 914 that causes the one or more processors 904 to communicate via the external interface 902 with at least one other entity, such as the UE or NG RAN, to obtain location related information for the UE measured by the at least one other entity. For example, location related information may include a plurality of channel measurements for at least one Wireless Access Point (WAP), wherein a channel comprises Line of Sight (LOS) and Non-LOS (NLOS) signals.

Memory 910 may include a signal source parameters unit 915 that enables the one or more processors 904 to determine channel parameters related to signal sources, e.g., based on WAP almanac information and channel measurements, wherein the channel parameters are indicative of positions of a plurality of signal sources relative to a first position information of a User Equipment (UE). In some embodiments, the signal source parameters unit 915 may enable the one or more processors 904 to associate signal sources with corresponding channel parameters. The signal source parameters unit 915 may further enable the one or more processors 904 to determine position information of at least one signal source, which may be, e.g., probability density function of the position of the signal source. The signal source parameters unit 915 may further enable the one or more processors 904 to determine a signal blockage probability corresponding to one or more signal sources. The signal source parameters unit 915 may further enable the one or more processors 904 to determine an antenna geometry for a signal source, e.g., where the signal source is a multi-antenna system or supports Multiple In Multiple Out (MIMO) communication. The signal source parameters unit 915 may further enable the one or more processors 904 to generate a set of signal source information for a signal source by aggregating signal source information corresponding to the signal source. The signal source parameters unit 915 may further enable the one or more processors 904 to determine a set of visible signal sources including virtual signal sources based on UE position information and the updated WAP almanac information.

Memory 910 may include a location determination unit 916 that causes the one or more processors 904 to determine a location for the UE based on the location information. In some embodiments, location determination unit 916 may include Bayesian filter (e.g. Bayesian filter 245) and may include functionality to perform one or more functions or flows described in FIGS. 2-7. In some embodiments, location determination unit 916 may include motion models (e.g. motion model 254 for UE 105) and/or a UE temporal signal blockage model (e.g. UE temporal signal blockage model 255, which may be based on UE motion). In some embodiments, location determination unit 916 may query WAP almanac information 208 for signal source information based on an estimated location of UE 105 (e.g. which may be received from UE 105, or from another entity, or based on a prior location of UE 105). In some embodiments, location determination unit 916 may determine a position of UE 105 using measurements received from UE 105 and/or another entity. In some embodiments, location determination unit 916 may include motion models (e.g. for UE 105) and/or a UE temporal signal blockage model (UE temporal signal blockage model 255, which may be based on UE motion), which may be used to determine UE location.

Memory 910 may include location assistance unit 918 that causes the one or more processors 904 to determine location assistance data to be provided to UEs 105. For example, the location assistance data may comprise WAP almanac information 208. In some embodiments, location assistance unit 918 may include functionality to query WAP almanac information 208 based on an estimated or prior UE position, to determine signal sources visible at that position and corresponding signal source information.

In some embodiments, memory 910 may include WAP almanac update unit 920 that causes the one or more processors 904 to enable updates to WAP almanac information 208. In some embodiments, WAP almanac update unit 920 may include functionality to perform some or all of the functions describe in FIG. 4. The updates may be based on information obtained by UE 105 (e.g. from a combination of RF measurements by UE 105 over time, RF surveys, area geometry information, etc.). For example, WAP almanac update unit 920 may include functionality to aggregate information pertaining to signal sources over a period of time, associate the signal source information with locations on a map, and update WAP almanac information 208.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software code may be stored in a memory and executed by one or more processor units, causing the processor units to operate as a special purpose computer programmed to perform all or a portion of the methods or flows disclosed herein (e.g. in FIGS. 2-5).

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Separately, in addition to storage on computer-readable storage medium, instructions and/or data may be provided as signals on transmission media included in a communication apparatus. For example, a communication apparatus may include a transceiver having signals indicative of instructions and data. The instructions and data can be stored on computer readable media, e.g., memory 910. When the stored instructions and data are read and executed by processor 904, the instructions and data and may configure the one or more processors to operate as a special purpose computer programmed to perform the methods and flows disclosed herein (e.g. in FIGS. 2-5). Thus, a communication apparatus may include transmission media with signals indicative of information to perform disclosed functions as outlined above. At a first time, the transmission media included in the communication apparatus may include a first portion of the information to perform the disclosed functions, while at a second time the transmission media included in the communication apparatus may include a second portion of the information to perform the disclosed functions.

In one implementation, an entity in a wireless network, such as network entity 900, may be configured to support position determination and may include a means for obtaining a plurality of channel measurements for at least one Wireless Access Point (WAP), wherein a channel comprises Line of Sight (LOS) and Non-LOS (NLOS) signals, which may be, e.g., the external interface 902 and one or more processors 904 with dedicated hardware or implementing executable code or software instructions in memory 910, such as the location information unit 914. A means for determining, based on WAP almanac information and the plurality of channel measurements for the at least one WAP, at least one corresponding set of channel parameters, wherein the channel parameters are indicative of positions of a plurality of signal sources relative to a first position information of a User Equipment (UE) may be, e.g., the one or more processors 904 with dedicated hardware or implementing executable code or software instructions in memory 910, such as the signal source parameters unit 915. A means for associating the plurality of signal sources with corresponding channel parameters in the at least one set of channel parameters may be, e.g., the one or more processors 904 with dedicated hardware or implementing executable code or software instructions in memory 910, such as the signal source parameter unit 915. A means for determining, based on the first position information of the UE and the association of the plurality of signal sources with corresponding channel parameters, a second position information of the UE may be, e.g., the one or more processors 904 with dedicated hardware or implementing executable code or software instructions in memory 910, such as the location determination unit 916.

The entity may further include a means for determining a position information of at least one signal source in the plurality of signal sources, which may be, e.g., the one or more processors 904 with dedicated hardware or implementing executable code or software instructions in memory 910, such as the signal source parameters unit 915. The entity may further include a means for determining, for the at least one signal source, a corresponding signal blockage probability, which may be, e.g., the one or more processors 904 with dedicated hardware or implementing executable code or software instructions in memory 910, such as the signal source parameters unit 915. The entity may further include a means for determining an antenna geometry for the at least one signal source, wherein the at least one signal source comprises a multi-antenna system or supports Multiple In Multiple Out (MIMO) communication, which may be, e.g., the one or more processors 904 with dedicated hardware or implementing executable code or software instructions in memory 910, such as the signal source parameters unit 915. The entity may further include a means for updating the WAP almanac information with the position information of the at least one signal source and the corresponding signal blockage probability of the at least one signal source and the antenna geometry for the at least one signal source which may be, e.g., the one or more processors 904 with dedicated hardware or implementing executable code or software instructions in memory 910, such as the WAP almanac update unit 920.

The means for determining the second position information of the UE, which may be, e.g., the one or more processors 904 with dedicated hardware or implementing executable code or software instructions in memory 910, such as the location determination unit 916, may provide the first position information of the UE and the association of the plurality of signal sources with corresponding channel parameters to a Bayesian filter, wherein the Bayesian filter determines the second position information of the UE.

In one implementation, an entity in a wireless network, such as network entity 900, may be configured to support position determination and may include a means for receiving a first signal source information for a plurality of signal sources over a period of time, wherein the first signal source information comprises, for each of the plurality of signal sources, a corresponding signal source position information, a corresponding signal blockage probability information, a corresponding signal source observation position, and a timestamp indicating a time of observation, which may be, e.g., the external interface 902 and one or more processors 904 with dedicated hardware or implementing executable code or software instructions in memory 910, such as the location information unit 914. A means for generating at least one set of signal source information corresponding to at least one signal source in the plurality of signal sources by aggregating the first signal source information corresponding to the at least one signal source may be, e.g., the one or more processors 904 with dedicated hardware or implementing executable code or software instructions in memory 910, such as the signal source parameters unit 915. A means for updating Wireless Access Point (WAP) almanac information with the at least one set of signal source information may be, e.g., the one or more processors 904 with dedicated hardware or implementing executable code or software instructions in memory 910, such as the WAP almanac update unit 920.

The entity may include a means for providing the updated WAP almanac information to one or more user equipments (UEs) as location assistance information, which may be, e.g., the external interface 902 and one or more processors 904 with dedicated hardware or implementing executable code or software instructions in memory 910, such as the location assistance unit 918.

The entity may further include a means for receiving a first user equipment (UE) position information, wherein the first UE position information comprises a probability density function of UE position, which may be, e.g., the external interface 902 and one or more processors 904 with dedicated hardware or implementing executable code or software instructions in memory 910, such as the location request processing unit 912, location information unit 914 or location determination unit 916. A means for determining a set of visible signal sources including virtual signal sources based on: the first UE position information and the updated WAP almanac information may be, e.g., the one or more processors 904 with dedicated hardware or implementing executable code or software instructions in memory 910, such as the signal source parameters unit 915. For example, the first UE position information may be received as part of a location assistance request from a user equipment (UE), and the entity may further include a means for providing, in response to the location assistance request, location assistance information to the UE, wherein the location assistance information comprises the set of visible signal source, which may be, e.g., the external interface 902 and one or more processors 904 with dedicated hardware or implementing executable code or software instructions in memory 910, such as the location assistance unit 918.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method to support position determination comprising:
   obtaining a plurality of channel measurements for at least one Wireless Access Point (WAP), wherein the plurality of channel measurements include Line of Sight (LOS) signal measurements and Non-LOS (NLOS) signal measurements of the at least one WAP;
   determining, based on WAP almanac information and the plurality of channel measurements for the at least one WAP, at least one corresponding set of channel parameters, wherein the channel parameters are indicative of positions of a plurality of signal sources relative to a previous position information of a User Equipment (UE), wherein one or more signal sources in the plurality of signal sources is a virtual signal source associated with the NLOS signal measurements;
   associating the plurality of signal sources with corresponding channel parameters in the at least one corresponding set of channel parameters;
   determining, based on the previous position information of the UE and the association of the plurality of signal sources with the corresponding channel parameters, a current position information of the UE; and
   updating the WAP almanac information based on position information of at least one signal source in the plurality of signal sources, a signal blockage probability of the at least one signal source, and an antenna geometry for the at least one signal source.

2. The method of claim 1, wherein the previous position information of the UE comprises a first probability density function of a previous UE position and the current position information of the UE comprises a second probability density function of a current UE position.

3. The method of claim 1, further comprising:
   determining the position information of the at least one signal source in the plurality of signal sources.

4. The method of claim 3, wherein the position information of the at least one signal source comprises a probability density function of a position of the at least one signal source.

5. The method of claim 4, further comprising:
   determining, for the at least one signal source, the signal blockage probability.

6. The method of claim 1, further comprising:
   determining the antenna geometry for the at least one signal source, wherein the at least one signal source comprises a multi-antenna system or supports Multiple In Multiple Out (MIMO) communication.

7. The method of claim 1, wherein the previous position information of the UE is determined based on inertial measurements related to a velocity of the UE and to rotational parameters associated with the UE.

8. The method of claim 1, wherein determining the current position information of the UE comprises:
   providing the previous position information of the UE and the association of the plurality of signal sources with the corresponding channel parameters to a Bayesian filter, wherein the Bayesian filter determines the current position information of the UE.

9. The method of claim 8, wherein the previous position information of the UE is determined based, on at least one of:
   a prior position of the UE provided by the Bayesian filter, and
   one of more of: a motion model for the UE, or inertial measurements related to a velocity of the UE and to rotational parameters associated with the UE, or a combination thereof.

10. The method of claim 1, wherein the at least one corresponding set of channel parameters comprise at least one of:
    an Angle of Arrival (AOA) of a corresponding channel signal, or
    an Angle of Departure (AOD) of the corresponding channel signal, or
    a phase vector associated with the corresponding channel signal, or
    an NLOS path length for the corresponding channel signal, or
    a combination thereof.

11. The method of claim 1, wherein the method is performed by at least one of:
    the UE, or a location server, or a network entity coupled to a wireless network associated with the UE; or some combination thereof.

12. The method of claim 11, wherein the location server forms part of a 5G Core Network (5GCN) and comprises a Location Management Function (LMF).

13. The method of claim 1, wherein the at least one WAP comprises at least one of: Base Stations associated with a Wireless Wide Area Network (WWAN), or Wireless Local Area Network (WLAN) APs; or some combination thereof.

14. The method of claim 1, wherein the WAP almanac information comprises at least one of: first position information for the at least one WAP, or second position information for the plurality of signal sources, or antenna geometry information for the at least one WAP, or third position information pertaining to one or more environmental features affecting radio frequency (RF) signal propagation.

15. The method of claim 1, wherein the association of the plurality of signal sources with the corresponding channel parameters comprises either:
    a deterministic mapping of signal sources to channel parameters, wherein each signal source is associated with a set of corresponding channel parameters; or
    a set of possible mappings of the signal sources to the channel parameters, wherein each possible mapping is associated with a probability mass function.

16. The method of claim 1, wherein the plurality of channel measurements comprise at least one of channel frequency response (CFR), Channel Impulse Response (CIR) measurements, power delay profile (PDP), or a combinate thereof.

17. An entity in a wireless network configured to support position determination comprising:
    an external interface configured to communicate with entities in the wireless network;
    at least one memory; and
    at least one processor coupled to the external interface and the at least one memory, the at least one processor configured to:
       obtain a plurality of channel measurements for at least one Wireless Access Point (WAP), wherein the plurality of channel measurements include Line of Sight (LOS) signal measurements and Non-LOS (NLOS) signal measurements of the at least one WAP;
       determine, based on WAP almanac information and the plurality of channel measurements for the at least one WAP, at least one corresponding set of channel parameters, wherein the channel parameters are indicative of positions of a plurality of signal sources relative to a previous position information of a User Equipment (UE), wherein one or more signal sources in the plurality of signal sources is a virtual signal source associated with the NLOS signal measurements;

associate the plurality of signal sources with corresponding channel parameters in the at least one corresponding set of channel parameters;

determine, based on the previous position information of the UE and the association of the plurality of signal sources with the corresponding channel parameters, a current position information of the UE; and update the WAP almanac information based on position information of at least one signal source in the plurality of signal sources, a signal blockage probability of the at least one signal source, and an antenna geometry for the at least one signal source.

18. The entity of claim 17, wherein the previous position information of the UE comprises a first probability density function of a previous UE position and the current position information of the UE comprises a second probability density function of a current UE position.

19. The entity of claim 17, wherein the at least one processor is further configured to:

determine the position information of the at least one signal source in the plurality of signal sources.

20. The entity of claim 19, wherein the position information of the at least one signal source comprises a probability density function of a position of the at least one signal source.

21. The entity of claim 20, wherein the at least one processor is further configured to:

determine, for the at least one signal source, the signal blockage probability.

22. The entity of claim 21, wherein the at least one processor is further configured to:

determine the antenna geometry for the at least one signal source, wherein the at least one signal source comprises a multi-antenna system or supports Multiple In Multiple Out (MIMO) communication.

23. The entity of claim 17, wherein the previous position information of the UE is determined based on inertial measurements related to a velocity of the UE and to rotational parameters associated with the UE.

24. The entity of claim 17, wherein the at least one processor is configured to determine the current position information of the UE by being configured to:

provide the previous position information of the UE and the association of the plurality of signal sources with the corresponding channel parameters to a Bayesian filter, wherein the Bayesian filter determines the current position information of the UE.

25. The entity of claim 24, wherein the previous position information of the UE is determined based, on at least one of:

a prior position of the UE provided by the Bayesian filter, and one of more of: a motion model for the UE, or inertial measurements related to a velocity of the UE and to rotational parameters associated with the UE, or a combination thereof.

26. The entity of claim 17, wherein the at least one corresponding set of channel parameters comprise at least one of:

an Angle of Arrival (AOA) of a corresponding channel signal, or an Angle of Departure (AOD) of the corresponding channel signal, or a phase vector associated with the corresponding channel signal, or an NLOS path length for the corresponding channel signal, or a combination thereof.

27. The entity of claim 17, wherein the entity is one of: the UE, a location server, or a network entity coupled to the wireless network associated with the UE.

28. The entity of claim 27, wherein the location server forms part of a 5G Core Network (5GCN) and comprises a Location Management Function (LMF).

29. The entity of claim 17, wherein the at least one WAP comprises at least one of: Base Stations associated with a Wireless Wide Area Network (WWAN), or Wireless Local Area Network (WLAN) APs; or some combination thereof.

30. The entity of claim 17, wherein the WAP almanac information comprises at least one of: first position information for the at least one WAP, or second position information for the plurality of signal sources, or antenna geometry information for the at least one WAP, or third position information pertaining to one or more environmental features affecting radio frequency (RF) signal propagation.

31. The entity of claim 17, wherein the association of the plurality of signal sources with the corresponding channel parameters comprises either:

a deterministic mapping of signal sources to channel parameters, wherein each signal source is associated with a set of corresponding channel parameters; or a set of possible mappings of the signal sources to the channel parameters, wherein each possible mapping is associated with a probability mass function.

32. The entity of claim 17, wherein the plurality of channel measurements comprise at least one of channel frequency response (CFR), Channel Impulse Response (CIR) measurements, power delay profile (PDP), or a combinate thereof.

33. An entity in a wireless network configured to support position determination comprising:

means for obtaining a plurality of channel measurements for at least one Wireless Access Point (WAP), wherein the plurality of channel measurements include Line of Sight (LOS) signal measurements and Non-LOS (NLOS) signal measurements of the at least one WAP;

means for determining, based on WAP almanac information and the plurality of channel measurements for the at least one WAP, at least one corresponding set of channel parameters, wherein the channel parameters are indicative of positions of a plurality of signal sources relative to a previous position information of a User Equipment (UE), wherein one or more signal sources in the plurality of signal sources is a virtual signal source associated with the NLOS signal measurements;

means for associating the plurality of signal sources with corresponding channel parameters in the at least one corresponding set of channel parameters;

means for determining, based on the previous position information of the UE and the association of the plurality of signal sources with the corresponding channel parameters, a current position information of the UE; and means for updating the WAP almanac information based on position information of at least one signal source in the plurality of signal sources, a signal blockage probability of the at least one signal source, and an antenna geometry for the at least one signal source.

34. The entity of claim 33, further comprising:
means for determining the position information of the at least one signal source in the plurality of signal sources.

35. The entity of claim 33, wherein the means for determining the current position information of the UE comprises:
means for providing the previous position information of the UE and the association of the plurality of signal sources with the corresponding channel parameters to a Bayesian filter, wherein the Bayesian filter determines the current position information of the UE.

36. The entity of claim 35, wherein the previous position information of the UE is determined based, on at least one of:
a prior position of the UE provided by the Bayesian filter, and
one of more of: a motion model for the UE, or inertial measurements related to a velocity of the UE and to rotational parameters associated with the UE, or a combination thereof.

37. The entity of claim 33, wherein the at least one corresponding set of channel parameters comprise at least one of:
an Angle of Arrival (AOA) of a corresponding channel signal, or
an Angle of Departure (AOD) of the corresponding channel signal, or
a phase vector associated with the corresponding channel signal, or
an NLOS path length for the corresponding channel signal, or
a combination thereof.

38. The entity of claim 33, wherein the association of the plurality of signal sources with the corresponding channel parameters comprises either:
a deterministic mapping of signal sources to channel parameters, wherein each signal source is associated with a set of corresponding channel parameters; or
a set of possible mappings of the signal sources to the channel parameters, wherein each possible mapping is associated with a probability mass function.

39. A non-transitory storage medium including program code stored thereon, the program code is operable to configure at least one processor in an entity in a wireless network to support position determination, the program code comprising instructions to:
obtain a plurality of channel measurements for at least one Wireless Access Point (WAP), wherein the plurality of channel measurements include Line of Sight (LOS) signal measurements and Non-LOS (NLOS) signal measurements of the at least one WAP;
determine, based on WAP almanac information and the plurality of channel measurements for the at least one WAP, at least one corresponding set of channel parameters, wherein the channel parameters are indicative of positions of a plurality of signal sources relative to a previous position information of a User Equipment (UE), wherein one or more signal sources in the plurality of signal sources is a virtual signal source associated with the NLOS signal measurements;
associate the plurality of signal sources with corresponding channel parameters in the at least one corresponding set of channel parameters;
determine, based on the previous position information of the UE and the association of the plurality of signal sources with the corresponding channel parameters, a current position information of the UE; and
update the WAP almanac information based on position information of at least one signal source in the plurality of signal sources, a signal blockage probability of the at least one signal source, and an antenna geometry for the at least one signal source.

40. The non-transitory storage medium of claim 39, wherein the program code further comprises instructions to:
determine the position information of the at least one signal source in the plurality of signal sources.

41. The non-transitory storage medium of claim 39, wherein the program code comprising instructions to determine the current position information of the UE further comprise instructions to:
provide the previous position information of the UE and the association of the plurality of signal sources with the corresponding channel parameters to a Bayesian filter, wherein the Bayesian filter determines the current position information of the UE.

42. The non-transitory storage medium of claim 41, wherein the previous position information of the UE is determined based, on at least one of:
a prior position of the UE provided by the Bayesian filter, and
one of more of: a motion model for the UE, or inertial measurements related to a velocity of the UE and to rotational parameters associated with the UE, or a combination thereof.

43. The non-transitory storage medium of claim 39, wherein the at least one corresponding set of channel parameters comprise at least one of:
an Angle of Arrival (AOA) of a corresponding channel signal, or
an Angle of Departure (AOD) of the corresponding channel signal, or
a phase vector associated with the corresponding channel signal, or
an NLOS path length for the corresponding channel signal, or
a combination thereof.

44. The non-transitory storage medium of claim 39, wherein the association of the plurality of signal sources with the corresponding channel parameters comprises either:
a deterministic mapping of signal sources to channel parameters, wherein each signal source is associated with a set of corresponding channel parameters; or
a set of possible mappings of the signal sources to the channel parameters, wherein each possible mapping is associated with a probability mass function.

* * * * *